(«12») United States Patent
Kabasawa et al.

(10) Patent No.: US 10,514,777 B2
(45) Date of Patent: *Dec. 24, 2019

(54) OPERATION METHOD AND CONTROL APPARATUS

(71) Applicant: SONY CORPORATION, Tokyo (JP)

(72) Inventors: Kenichi Kabasawa, Saitama (JP); Tetsuro Goto, Tokyo (JP); Masatoshi Ueno, Kanagawa (JP); Shinobu Kuriya, Kanagawa (JP); Toshiyuki Nakagawa, Kanagawa (JP); Tatsuya Suzuki, Kanagawa (JP); Tsubasa Tsukahara, Tokyo (JP); Hideo Kawabe, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,601

(22) Filed: Jul. 31, 2017

(65) Prior Publication Data

US 2017/0329420 A1 Nov. 16, 2017

Related U.S. Application Data

(63) Continuation of application No. 14/391,311, filed as application No. PCT/JP2013/002189 on Mar. 29, 2013, now Pat. No. 9,740,305.

(30) Foreign Application Priority Data

Apr. 18, 2012 (JP) ................. 2012-094894

(51) Int. Cl.
*G06F 3/0346* (2013.01)
*G06F 3/01* (2006.01)
*G06F 3/0485* (2013.01)

(52) U.S. Cl.
CPC ............ *G06F 3/0346* (2013.01); *G06F 3/016* (2013.01); *G06F 3/017* (2013.01); *G06F 3/0485* (2013.01)

(58) Field of Classification Search
CPC ...... G06F 3/0346; G06F 3/0485; G06F 3/017; G06F 3/0362; G06F 3/03547;
(Continued)

(56) References Cited

U.S. PATENT DOCUMENTS 5,923,318 A 7/1999 Zhai et al.
6,072,467 A 6/2000 Walker
(Continued)

FOREIGN PATENT DOCUMENTS

EP 1351119 A1 10/2003
EP 2407862 A1 1/2012
JP 2010-537547 A 12/2010

OTHER PUBLICATIONS

International Search Report for PCT Patent Application No. PCT/JP2013/002189, dated May 28, 2014, 04 pages.
(Continued)

*Primary Examiner* — Grant Sitta
(74) *Attorney, Agent, or Firm* — Chip Law Group

(57) ABSTRACT

A control apparatus comprising a processor, a memory, and a communication circuit configured to communicate with an input apparatus is provided. The memory device stores instructions which when executed by the processor, causes the processor to receive displacement information from the input apparatus, and generate a displacement value for displacing an operation target on a display based on the displacement information, wherein a first set of instructions is used to calculate the displacement value if the displacement information is within a predetermined range, and a second set of instructions is used to calculate the displace-
(Continued)

ment value if the displacement information is outside the predetermined range; and transmit a feedback signal to the input apparatus at a timing based on the displacement information, wherein the timing is calculated differently if the displacement information is within the predetermined range than if the displacement information is outside the predetermined range.

11 Claims, 15 Drawing Sheets

(58) Field of Classification Search
CPC .... G06F 3/038; G06F 3/03543; G06F 3/0338; G06F 3/0383; G06F 3/044; G06F 1/169; G06F 3/016; G06F 3/0482; G06F 3/0487
See application file for complete search history.

(56) References Cited

U.S. PATENT DOCUMENTS

| | | | | |
|---|---|---|---|---|
| 6,447,448 | B1* | 9/2002 | Ishikawa | A61B 5/0031 128/899 |
| 7,089,292 | B1 | 8/2006 | Roderick et al. | |
| 7,710,393 | B2* | 5/2010 | Tsuk | G06F 1/1626 345/156 |
| 8,847,883 | B2* | 9/2014 | Nakagawa | G06F 3/0338 345/156 |
| 2001/0030658 | A1* | 10/2001 | Rosenberg | A63F 13/06 715/701 |
| 2003/0058216 | A1 | 3/2003 | Lacroix et al. | |
| 2003/0142065 | A1* | 7/2003 | Pahlavan | G06F 3/0346 345/156 |
| 2004/0100441 | A1* | 5/2004 | Rekimoto | G06F 1/1626 345/158 |
| 2004/0140962 | A1* | 7/2004 | Wang | G06F 3/0346 345/179 |
| 2004/0166912 | A1* | 8/2004 | Stienstra | G06F 3/033 463/1 |
| 2004/0189600 | A1 | 9/2004 | Hinckley et al. | |
| 2005/0174324 | A1* | 8/2005 | Liberty | G06F 3/017 345/156 |
| 2005/0243061 | A1 | 11/2005 | Liberty et al. | |
| 2005/0246109 | A1* | 11/2005 | Bang | G01P 13/00 702/41 |
| 2006/0001644 | A1* | 1/2006 | Arakawa | G06F 3/0346 345/156 |
| 2006/0061545 | A1 | 3/2006 | Hughes et al. | |
| 2007/0091063 | A1 | 4/2007 | Nakamura et al. | |
| 2007/0137301 | A1* | 6/2007 | Lian | A63B 69/20 73/510 |
| 2007/0273645 | A1* | 11/2007 | Bang | G06F 3/0346 345/157 |
| 2008/0042984 | A1 | 2/2008 | Lim et al. | |
| 2008/0082928 | A1 | 4/2008 | Walter et al. | |
| 2008/0174550 | A1 | 7/2008 | Laurila et al. | |
| 2008/0198139 | A1 | 8/2008 | Lacroix et al. | |
| 2008/0286733 | A1* | 11/2008 | Claudel | A63B 69/002 434/251 |
| 2009/0040175 | A1* | 2/2009 | Xu | G06F 3/0346 345/156 |
| 2009/0225030 | A1* | 9/2009 | Vaananen | G06F 3/0354 345/163 |
| 2010/0039373 | A1 | 2/2010 | Braun et al. | |
| 2010/0103100 | A1* | 4/2010 | Yamamoto | G06F 3/038 345/158 |
| 2010/0259471 | A1 | 10/2010 | Takano et al. | |
| 2012/0011932 | A1* | 1/2012 | Nakagawa | G06F 3/0346 73/379.02 |
| 2012/0154267 | A1* | 6/2012 | Albano | G06F 3/0346 345/156 |
| 2012/0179408 | A1* | 7/2012 | Goto | G06F 3/0346 702/104 |
| 2012/0256739 | A1* | 10/2012 | Kawabe | B25J 13/025 340/407.2 |
| 2013/0141464 | A1 | 6/2013 | Hunt et al. | |
| 2015/0097774 | A1* | 4/2015 | Kabasawa | G06F 3/016 345/158 |

OTHER PUBLICATIONS

Harrison BL et al., "Squeeze Me, Hold Me, Tilt Me! An Exploration of Manipulative User Interfaces", CHI '98, Human Factors in Computing Systems, Conference Proceedings, Los Angeles, CA, Apr. 18-23, 1998, New York, NY, pp. 17-24.
Notice of Allowance and Fees Due (PTOL-85) for U.S. Appl. No. 14/391,311, dated Apr. 25, 2017, 07 pages.
Final Rejection for U.S. Appl. No. 14/391,311, dated Feb. 15, 2017, 10 pages.
Non-Final Rejection for U.S. Appl. No. 14/391,311, dated Oct. 6, 2016, 16 pages.
Advisory Action (PTOL-303) for U.S. Appl. No. 14/391,311, dated Jun. 2, 2016, 03 pages.
Final Rejection for U.S. Appl. No. 14/391,311, dated Mar. 28, 2016, 11 pages.
Non-Final Rejection for U.S. Appl. No. 14/391,311, dated Nov. 19, 2015, 08 pages.

* cited by examiner

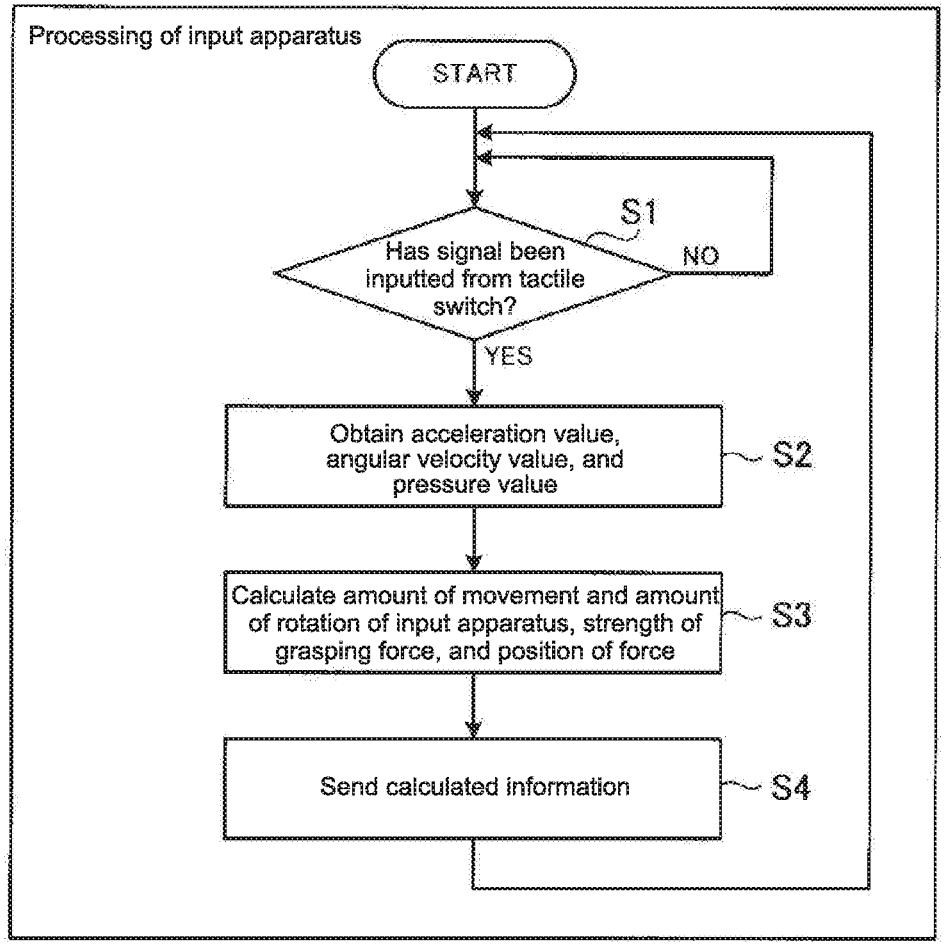
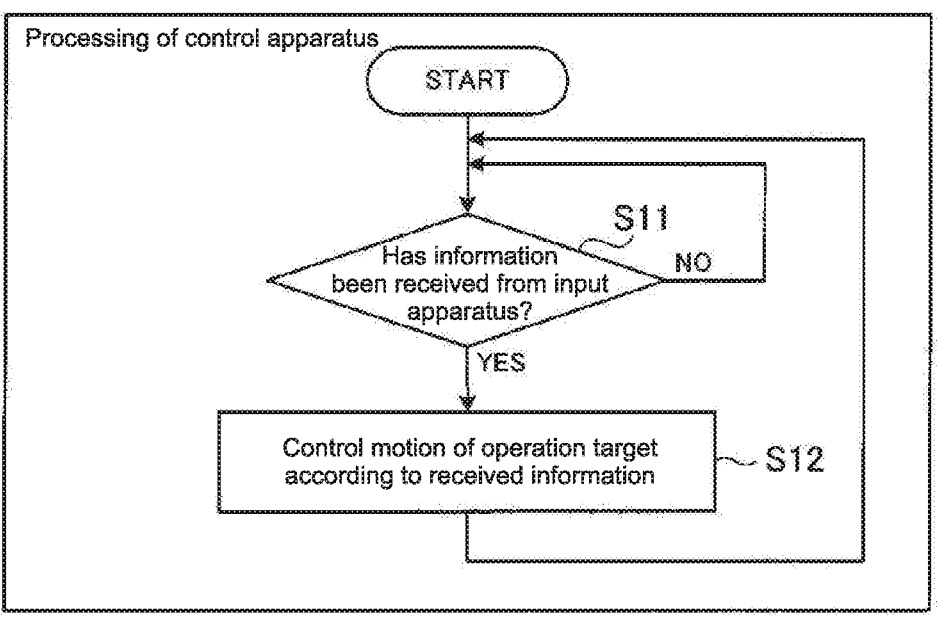

Operation for winding up spring

Direction of travel

OPERATION METHOD AND CONTROL APPARATUS

CROSS-REFERENCE PARAGRAPH

The present application is a continuation application of U.S. patent application Ser. No. 14/391,311, filed Oct. 8, 2014, which is a National Stage of PCT/JP2013/002189, filed Mar. 29, 2013, and claims the benefit of priority from prior Japanese Patent Application JP 2012-094894, filed Apr. 18, 2012, each of the above-referenced applications is hereby incorporated herein by reference in its entirety.

TECHNICAL FIELD

The present disclosure relates to an operation method, a control apparatus, and a program that perform an input operation of an operation target displayed two-dimensionally or three-dimensionally on a screen.

BACKGROUND ART

From the past, mouses have been widely used as input apparatuses for operating a graphical user interface (GUI) displayed two-dimensionally on a screen. In recent years, not only input apparatuses operated in a plane as typified by the mouses but also a wide variety of input apparatuses operated in a three-dimensional space have been proposed. Further, a slide bar displayed one-dimensionally and operated in one axis direction, a rotatable dial operated corresponding to a predetermined rotation angle, and the like have been generally used for simple settings such as sound volume control.

Irrespective of what kind of operation is performed by an input apparatus, it is often advantageous to provide some feedback to a user rather than the user operating the input apparatus while viewing only a screen display. In view of this, using a sound, a light, or a vibration of feedback about an operation has been considered. In such an input apparatus, a sensor or the like housed in an input apparatus detects acceleration or the like of the input apparatus. The kind or the like of an input operation performed on the input apparatus is determined based on a detection result of the sensor. In this context, for example, a technology disclosed in Patent Literature 1 is known as the input apparatus.

Specifically, the technology disclosed in Patent Literature 1 is a technology of rotating a stick-like control apparatus and displaying a screen rotated corresponding to the rotation of the control apparatus.

CITATION LIST

Patent Literature

PTL 1
Japanese Patent Application Laid-open No. 2010-537547

SUMMARY

Technical Problem

By the way, even when the user deliberately rotates and moves the input apparatus slowly, if the sensitivity of the sensor is not sufficient, it is difficult to detect the operation by the user. Therefore, it is sometimes difficult to move an operation target in an intended direction on a screen. Further, if the sensitivity of the sensor is increased, an operation target malfunctions because the sensor detects a vibration of a hand holding the input apparatus. Therefore, even if a traditional input apparatus is used instead of a controller of the electronic apparatus, it may be difficult to finely control a setting value.

In contrast, when the user quickly rotates or moves the input apparatus, an amount of displacement of the input apparatus sometimes departs from a detectable range of the sensor. At this time, the displayed operation target does not move at a high velocity as expected by the user, which may make the user feel stress.

Further, unless the input apparatus provides appropriate feedback to the user, it is difficult for the user to judge whether or not an operation by the user correctly moves the operation target.

In view of the above-mentioned circumstances, it is desirable to operate an operation target displayed on a screen as intended by a user.

Solution to Problem

According to an embodiment of the present disclosure, a control apparatus comprising a processor, a memory, and a communication circuit configured to communicate with an input apparatus is provided. The memory device stores instructions which when executed by the processor, causes the processor to receive displacement information from the input apparatus, and at least one of: (i) generate a displacement value for displacing an operation target on a display based on the displacement information, wherein a first set of instructions is used to calculate the displacement value if the displacement information is within a predetermined range, and a second set of instructions is used to calculate the displacement value if the displacement information is outside the predetermined range; and (ii) transmit a feedback signal to the input apparatus at a timing based on the displacement information, wherein the timing is calculated differently if the displacement information is within the predetermined range than if the displacement information is outside the predetermined range.

With this configuration, it is possible to displace the operation target by an emphasized amount if the displacement information from the input apparatus departs from the predetermined range.

Advantageous Effects of Invention

According to embodiments of the present disclosure, an operation target is displaced by an emphasized amount. With this, it becomes easy to reflect an operation intended by a user on displacement of the operation target displayed on the display apparatus. Thus, feedback indicating that the operation target is displaced is appropriately provided. Therefore, the user can perform the operation of the operation target without any stress.

BRIEF DESCRIPTION OF DRAWINGS

FIGS. 7A and 7B are flowcharts showing exemplary operations of the control system according to the embodiment of the present disclosure.

DESCRIPTION OF EMBODIMENTS

Hereinafter, referring to the attached drawings, favorable embodiments of the present disclosure will be described in detail. Note that, in this specification and the drawings, components having substantially the same functional configuration are denoted by the same reference symbols and duplicate descriptions will be omitted. In an input apparatus according to embodiments of the present disclosure, an operation method performed by cooperation of inner blocks (to be described later) is realized by a computer executing a program.

1. Embodiment (example in which feedback is provided corresponding to motion of operation target)
2. Modified example
1. Embodiment
Entire Configuration of System First, referring to FIG. 1, a control system according to an embodiment of the present disclosure will be described.

Figure 1:
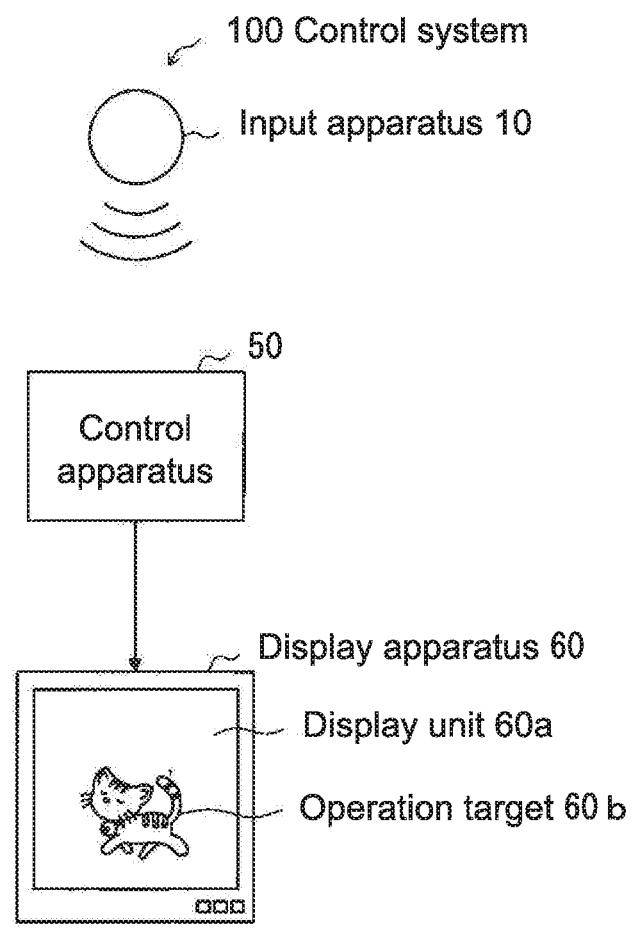
FIG. 1 is a block diagram showing an exemplary configuration of a control system including an input apparatus, a control apparatus, and a display apparatus according to an embodiment of the present disclosure.

FIG. 1 shows a control system 100 including an input apparatus 10 according to the embodiment of the present disclosure and each embodiment (to be described later). The control system 100 includes the input apparatus 10, a control apparatus 50, and a display apparatus 60.

For example, the input apparatus 10 is a spherical device on which a user performs an input operation for operating an operation target 60b displayed on a screen of a display unit 60a. The control apparatus 50 controls a display of the operation target 60b according to an operation performed on the input apparatus 10.

For example, the control apparatus 50 may be an apparatus dedicated to the input apparatus 10 or may be a personal computer (PC). With this, in the control system 100, the user can remotely operate the operation target 60b by operating the input apparatus 10.

Note that, the display unit 60a is constituted of, for example, a liquid-crystal display or an electro-luminescence (EL) display. The display unit 60a may display a two-dimensional image or a three-dimensional image. The display unit 60a displays the operation target 60b two-dimensionally or three-dimensionally. The operation target 60b is to be operated by the input apparatus 10.

Examples of the operation target 60b displayed two-dimensionally on the display unit 60a include graphical user interfaces (GUIs) such as a pointer, an icon, and a window. Examples of the operation target 60b displayed on the display unit 60a three-dimensionally include human and animal character images. Note that, those are merely examples and the operation target 60b may be any image as long as the image is displayed two-dimensionally or three-dimensionally.

Further, the display apparatus 60 may be a television apparatus capable of receiving television broadcasting and the like. Alternatively, in the case where the display apparatus 60 displays the operation target 60b three-dimensionally, the display apparatus 60 may be a stereoscopic-image display apparatus that displays a stereoscopic image that the user can see with the naked eyes. FIG. 1 shows a case where the control apparatus 50 is separated from the display apparatus 60. However, the control apparatus 50 may be integrated with the display apparatus 60. Further, a projector or the like may be used as the display apparatus that displays the operation target 60b. In this case, it may be possible to operate the operation target 60b projected on a screen or a wall surface by the projector.

Exemplary Configuration of Input Apparatus

Figure 2:
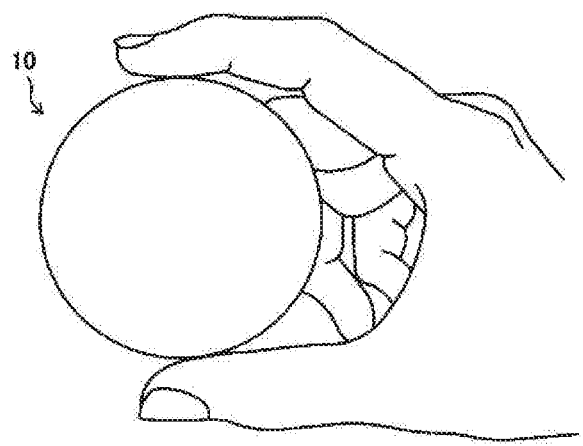
FIG. 2 is an explanatory diagram showing a state in which a user grasps the input apparatus according to the embodiment of the present disclosure.

FIG. 2 is a view showing a state in which the user grasps the input apparatus 10. As shown in FIG. 2, the input apparatus 10 has a spherical shape. The input apparatus 10 has a size slightly larger or slightly smaller than that of a baseball hardball. Specifically, the input apparatus 10 has a diameter of approximately from 50 mm to 100 mm, for example. With this, it becomes easy for the user to handle the input apparatus 10 when the user grasps the input apparatus 10. Of course, the diameter of the input apparatus 10 is not limited to the above range and other values may be possible.

Figure 3:
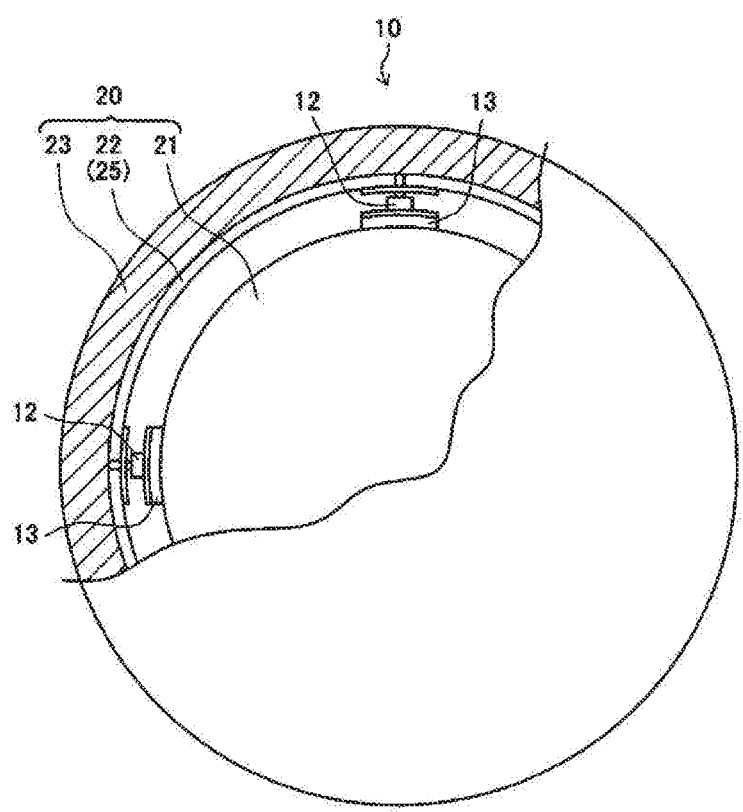
FIG. 3 is a partially broken view of the input apparatus according to the embodiment of the present disclosure.
Figure 4:
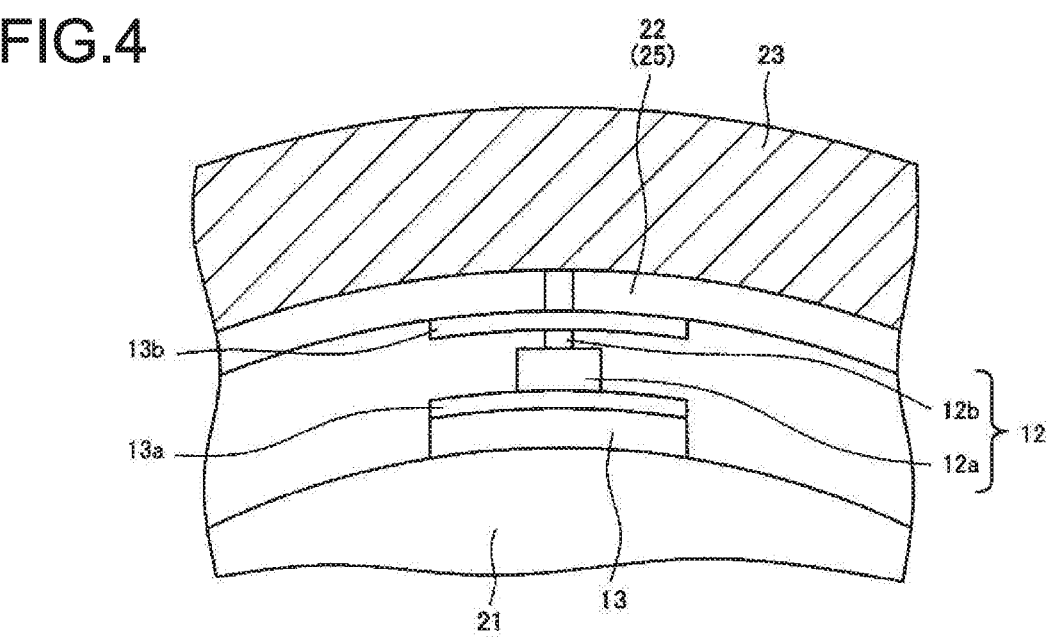
FIG. 4 is a partially enlarged view of the broken view of FIG. 3.
Figure 5A:
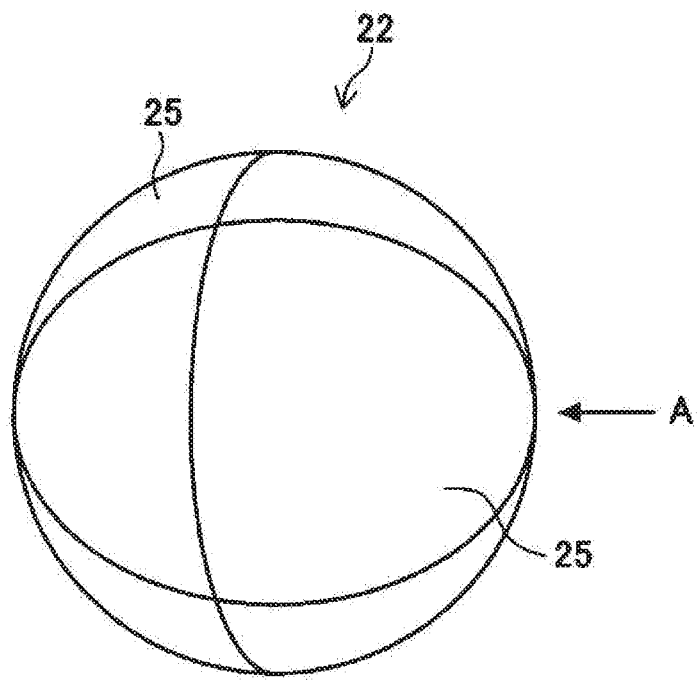
FIGS. 5A and 5B are outer appearance views showing a shell-like portion of the input apparatus according to the embodiment of the present disclosure.
Figure 5B:
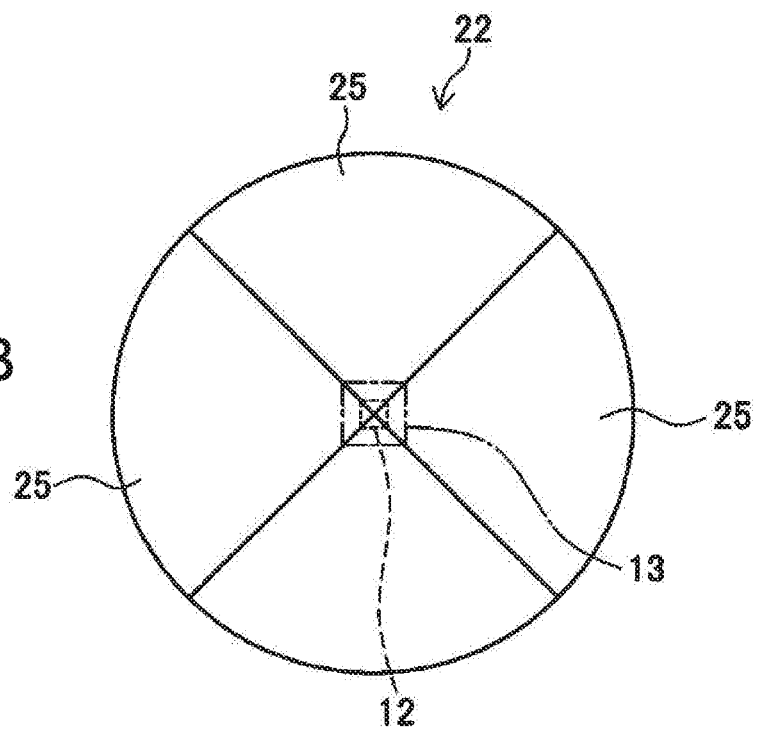

FIG. 3 is a partially broken view of the input apparatus 10. FIG. 4 is a partially enlarged view of the broken view of FIG. 3. Further, FIGS. 5A and 5B are outer appearance views of a shell-like portion 22 of the input apparatus 10. FIG. 5A shows the shell-like portion 22 as viewed from an oblique upper direction. FIG. 5B shows the shell-like portion 22 as viewed from the A-direction of FIG. 5A.

The input apparatus 10 includes an input apparatus main body 20. The input apparatus main body 20 includes a core portion 21, the shell-like portion 22, and a holding portion 23. The core portion 21 is provided at the center of the input apparatus 10 and has a spherical shape. The shell-like portion 22 is provided to entirely cover a surface of the core portion 21 and has a spherical shell shape. The holding portion 23 is provided to entirely cover a surface of the shell-like portion 22.

The input apparatus 10 further includes a tactile switch 12 (switch portion). The tactile switch 12 detects that the input apparatus 10 is grasped with predetermined strength or more, and generates a click sense. The input apparatus 10 further includes a pressure sensor 13 that detects the strength of the force with which the user grasps the input apparatus 10 (i.e., detects grasping force).

The core portion 21 has a cavity inside the core portion 21. A circuit board on which electronic components such as a central processing unit (CPU) 11 are mounted is provided in the cavity inside the core portion 21.

The shell-like portion 22 is constituted of eight plates 25 having the same shape (see FIGS. 5A and 5B). Each of the plates 25 has an almost equilateral triangle shape. The respective four plates 25 of the eight plates 25 are adjacent to one other with the vertices of the respective corners of the four plates 25 being collected at one point. The vertices are respectively collected at a total of six points. The tactile switch 12 and the pressure sensor 13 are provided at each of positions corresponding to the six points. That is, the input apparatus 10 according to this embodiment includes the six tactile switches 12 and the six pressure sensors 13. The tactile switch 12 and the pressure sensor 13 are provided between the surface of the core portion 21 and an inner surface of the shell-like portion 22 (plate 25) (see FIGS. 3 and 4).

The pressure sensor 13 is provided on the surface of the core portion 21. The tactile switch 12 is provided on the pressure sensor 13. A first pressure diffusion plate 13a is provided between the pressure sensor 13 and the tactile switch 12. A second pressure diffusion plate 13b is provided between the tactile switch 12 and the inner surface of the shell-like portion 22 (plate 25). The first pressure diffusion plate 13a and the second pressure diffusion plate 13b allow the force with which the user grasps the holding portion 23 to be uniformly transmitted to the pressure sensor 13. The pressure sensor 13 senses the strength of the force with which the user grasps the input apparatus main body 20.

The tactile switch 12 includes a switch main body 12a and a movable potion 12b. The movable potion 12b is movable with respect to the switch main body 12a. The tactile switch 12 further includes, inside the tactile switch 12, an electrical switch mechanism (not shown) to be turned on/off according to a movement of the movable potion 12b. The tactile switch 12 further includes a click-sense generation mechanism (not shown) using an elastic body such as a plate spring that generates a click sense according to the movement of the movable potion 12b.

However, the pressure sensor 13 and the tactile switch 12 are not limited to have the above configuration. For example, one or two pressure sensors 13 may be provided for one plate 25 or four or more pressure sensors 13 may be provided for one plate 25. Further, rather than sharing the pressure sensor 13 among a plurality of plates 25, the pressure sensor 13 may be independently provided for each plate 25.

Typically, the pressure sensor 13 may be in any form as long as the pressure sensor 13 can detect force applied to the plate 25 (shell-like portion 22) when the user grasps the input apparatus 10. Further, the number of plates 25 (number of dividing shell-like portion 22) is not limited to eight. For example, two or four plates 25 may be used.

The core portion 21 and the shell-like portion 22 are made of, for example, metal or a resin. On the other hand, the holding portion 23 is made of material softer than the core portion 21 and the shell-like portion 22. Examples of the material of the holding portion 23 include sponge formed by foaming a synthetic resin such as polyurethane. Using the sponge or the like for the material of the holding portion 23 can enhance a tactile sense. Further, using the sponge or the like for the material of the holding portion 23 allows the user to finely control the strength of the force with which the user grasps the input apparatus 10.

Figure 6:
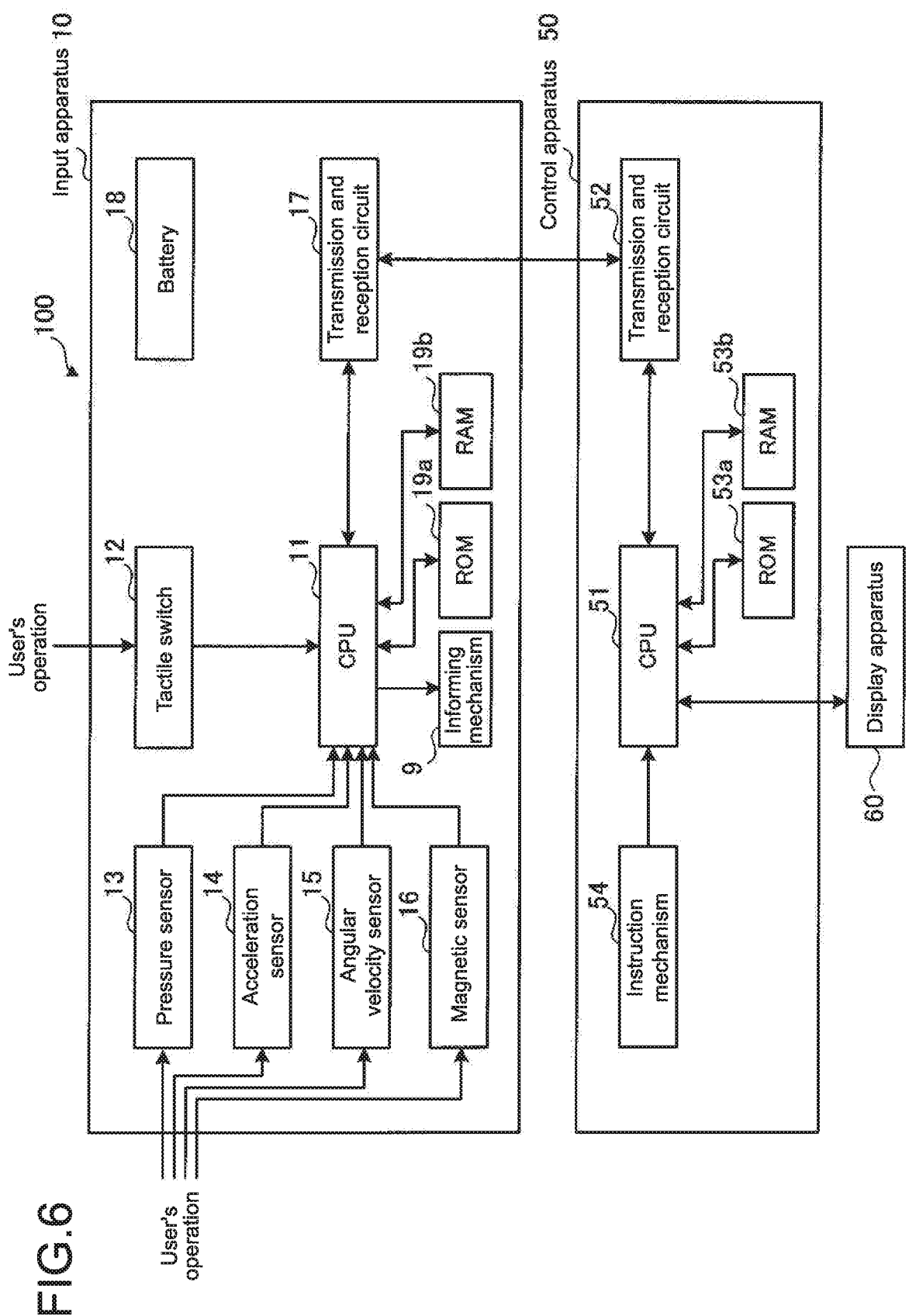
FIG. 6 is a block diagram showing an electrical configuration of the control system according to the embodiment of the present disclosure.

Next, an electrical configuration of the control system 100 will be described with reference to FIG. 6. FIG. 6 is a block diagram showing the electrical configuration of the control system 100.

First, referring to FIG. 6, the electrical configuration of the input apparatus 10 will be described.

The input apparatus 10 includes an informing mechanism 9, the CPU 11, the tactile switch 12, the pressure sensor 13, an acceleration sensor 14, an angular velocity sensor 15, and a magnetic sensor 16. In addition, the input apparatus 10 includes a transmission and reception circuit 17, a battery 18, a read only memory (ROM) 19a, and a random access memory (RAM) 19b. Note that, a light-emitting mechanism such as a light-emitting diode (LED), a sound-emitting mechanism such as a speaker, or a vibration generation mechanism may be used for the informing mechanism 9, to thereby provide information using at least one of a light, a sound, and a vibration.

The informing mechanism 9, the CPU 11, the acceleration sensor 14, the angular velocity sensor 15, the magnetic sensor 16, the transmission and reception circuit 17, the ROM 19a, and the RAM 19b are mounted on the circuit board (not shown). The battery 18 and the circuit board on which the electronic components are mounted are provided in the cavity formed inside the core portion 21.

The acceleration sensor 14 and the angular velocity sensor 15 each detect a movement of the input apparatus 10 in a three-dimensional space. Specifically, the acceleration sensor 14 detects acceleration in three axis directions orthogonal to each other and outputs an acceleration value (one example of displacement value) corresponding to the detected acceleration to the CPU 11. On the other hand, the angular velocity sensor 15 detects an angular velocity around three axes orthogonal to each other and outputs an angular velocity value (one example of displacement value) corresponding to the detected angular velocity to the CPU 11. In addition, the magnetic sensor 16 detects a geomagnetic direction (e.g., magnetic north) of the input apparatus 10 in the three-dimensional space and outputs a magnetic value (one example of displacement value) corresponding to the detected geomagnetic direction to the CPU 11.

The tactile switch 12, the pressure sensor 13, a touch sensor, and the like are used as pressure-sensing portions. The tactile switch 12 outputs a signal to the CPU 11 when the switch mechanism is turned on. The pressure sensor 13 is one example of the pressure sensor that outputs a pressure value corresponding to the strength of the force with which the user grasps the input apparatus 10 to the CPU 11.

In order to control the operation target, the CPU 11 executes various arithmetic operations based on the angular velocity value, the acceleration value, the magnetic value, and the pressure value outputted from the acceleration sensor 14, the angular velocity sensor 15, the magnetic sensor 16, and the pressure sensor 13, respectively. When an input operation of the operation target 60*b* displayed on the display apparatus 60 is performed on the input apparatus 10, the CPU 11 outputs a displacement value corresponding to a first displacement amount of the input apparatus 10. This displacement value includes, for example, the acceleration value, the angular velocity value, the magnetic value, and the pressure value. Further, the first displacement amount is a value calculated based on an amount of displacement along one axis, two orthogonal axes, or three orthogonal axes.

Then, the CPU 11 sends the acceleration value, the angular velocity value, the magnetic value, and the pressure value to the control apparatus 50 through the transmission and reception circuit 17. It should be noted that the CPU 11 may calculate, based on those values, an amount of movement of the input apparatus 10 in a space, an amount of rotation of the input apparatus 10, an angle of the input apparatus 10 with respect to the magnetic north, the strength of the force with which the user grasps the input apparatus 10, and a position at which the force is applied, for example. Note that, the CPU 11 executes the various arithmetic operations in a state in which the CPU 11 receives the signal from the switch mechanism of the tactile switch 12.

The transmission and reception circuit 17 includes an antenna or the like (not shown). The transmission and reception circuit 17 sends various types of information to the control apparatus 50 under the control by the CPU 11. Note that, the transmission and reception circuit 17 is also capable of receiving information from the control apparatus 50.

For example, a rechargeable secondary battery is used as the battery 18. A charge unit (not shown) is housed in the input apparatus main body 20.

Feedback indicating that the operation target 60*b* is displaced is provided to the user. In this embodiment, feedback is provided by the informing mechanism 9 informing the user of the displacement of the operation target 60*b*. Here, the informing mechanism 9 may inform the user of the displacement of the operation target 60*b*, providing different feedback for each amount of displacement of the operation target 60*b* along one axis.

Configuration of Control Apparatus

Next, referring to FIG. 6, an electrical configuration of the control apparatus 50 will be described.

The control apparatus 50 includes a CPU 51, a transmission and reception circuit 52, a ROM 53*a*, a RAM 53*b*, and an instruction mechanism 54.

The ROM 53*a* is a non-volatile memory. Various programs necessary for processing of the CPU 51 are stored in the ROM 53*a*. The RAM 53*b* is a volatile memory. The RAM 53*b* is used as a work area for the CPU 51.

The transmission and reception circuit 52 includes an antenna or the like (not shown). The transmission and reception circuit 52 receives various types of information from the input apparatus 10. The transmission and reception circuit 52 is also capable of sending a signal to the input apparatus 10.

For example, the instruction mechanism 54 is a keyboard. The user performs settings such as initial settings and specific settings via the instruction mechanism 54. The instruction mechanism 54 receives various instructions from the user and outputs inputted signals to the CPU 51.

The CPU 51 controls the operation target displayed on the display apparatus 60, based on the various types of information received by the transmission and reception circuit 52.

Operations of Input Apparatus

Next, operations of the control system 100 according to this embodiment will be described.

FIGS. 7A and 7B are flowcharts showing exemplary operations of the control system 100 according to this embodiment. FIG. 7A shows processing of the input apparatus 10. FIG. 7B shows processing of the control apparatus 50.

First, the user picks up the input apparatus 10 and moves the input apparatus 10 to a position at which the user can easily operate the input apparatus 10. Note that, at this time, the operation target 60*b* displayed on the display unit 60*a* does not move (see NO in Step S1). Next, the user grasps the holding portion 23 of the input apparatus main body 20 with predetermined strength or more, indicating an intention to start an operation on the input apparatus 10. Then, the shell-like portion 22 (plate 25) of the input apparatus main body 20 and the movable potion 12*b* of the tactile switch 12 are moved toward the center of the input apparatus 10. When the movable potion 12*b* of the tactile switch 12 is moved toward the center of the input apparatus 10, the click-sense generation mechanism generates a click sense.

The input apparatus 10 can appropriately respond the intention of the user to start the operation of the operation target 60*b*, by a response using the click sense. Due to this click sense, the user can easily recognize that the operation of the operation target 60*b* is to be started. Further, the response using the click sense generated by the click-sense generation mechanism is directly performed not through the CPU, and hence the user can quickly receive the response using the click sense.

When the movable potion 12*b* of the tactile switch 12 moves toward the center of the input apparatus 10, the click sense is generated. At the same time, the switch mechanism of the tactile switch 12 is turned on and inputs a signal into the CPU 11 (YES in Step S1).

When the CPU 11 receives the signal from the tactile switch 12, the CPU 11 obtains an acceleration value, an angular velocity value, and a pressure value from the acceleration sensor 14, the angular velocity sensor 15, and the pressure sensor 13, respectively (Step S2). Note that, the flowchart does not refer to the magnetic value because the magnetic value obtained from the magnetic sensor 16 is used for correcting the orientation of the input apparatus 10 with respect to the display apparatus 60 at the operation start.

Next, the CPU 11 executes an arithmetic operation based on the acceleration value and the angular velocity value to determine the amount of movement and the amount of rotation of the input apparatus 10 (per predetermined period of time) (Step S3). Further, the CPU 11 executes an arithmetic operation using vector calculation and the like based on the pressure value to determine the strength of the force with which the user grasps the input apparatus 10 (strength of force applied to plate 25) and a position at which the force is applied.

Next, the CPU 11 sends the calculated information (amount of movement and amount of rotation of input apparatus 10, strength of force with which user grasps input apparatus 10, and position at which force is applied) to the control apparatus 50 through the transmission and reception circuit 17 (Step S4).

The CPU 51 of the control apparatus 50 makes a determination as to whether or not the control apparatus 50 has received the information from the input apparatus 10 (Step 11). When the control apparatus 50 has received the information from the input apparatus 10, the CPU 51 of the control apparatus 50 controls the operation target 60b according to the received information (Step S12). Note that, in Step S12, the CPU 51 of the control apparatus 50 may execute a further arithmetic operation on the received information for increasing the precision of control of the operation target 60b.

For example, it is assumed that the operation target 60b is a character image displayed three-dimensionally. In this case, in Step S12, the CPU 51 executes processing of moving and rotating the character image three-dimensionally according to the information on the amount of movement and the amount of rotation of the input apparatus 10. Further, the CPU 51 executes processing of causing the character image to make a particular motion (e.g., jump, squat, smile, or get angry) according to the information on the strength of the force with which the user grasps the input apparatus 10 and the information on the position at which the force is applied. Note that, how the operation target 60b is controlled according to the information on the amount of movement, the amount of rotation, the strength of the force with which the user grasps the input apparatus 10, and the position at which the force is applied is not particularly limited.

The processing of FIGS. 7A and 7B enables the user to cause the operation target 60b to make an arbitrary motion by grasping the input apparatus 10 with predetermined strength or more and moving or rotating the input apparatus 10, grasping the input apparatus 10 with more strength, or firmly pressing a particular position of the input apparatus 10.

On the other hand, for (temporarily) stopping the operation of the operation target 60b, the user reduces the strength of the force with which the user grasps the input apparatus 10. The user reduces the strength of the force with which the user grasps the input apparatus 10 and the strength of the grasping force drops to below the predetermined strength. Then, the movable potion 12b of the tactile switch 12 and the shell-like portion 22 (plate 25) of the input apparatus main body 20 are moved away from the center of the input apparatus 10. When the movable potion 12b of the tactile switch 12 moves away from the center of the input apparatus 10, the click-sense generation mechanism generates a click sense.

The input apparatus 10 can appropriately respond the intention of the user to stop the operation of the operation target 60b, by a response using the click sense. Due to this click sense, the user can easily recognize that the operation of the operation target 60b is stopped. When the movable potion 12b of the tactile switch 12 moves away from the center of the input apparatus 10, the click sense is generated. At the same time, the output of the signal by the switch mechanism of the tactile switch 12 is stopped. With this, the input of the signal by the tactile switch 12 into the CPU 11 is stopped (NO in Step S1), and the motion of the operation target 60b is stopped.

By grasping the input apparatus 10 with the above-mentioned predetermined strength or more and reducing the strength of the force with which the user grasps the input apparatus 10, the user can arbitrarily select whether or not the operation on the input apparatus 10 (spatial operation or operation depending on strength of grasping force) is reflected on the operation of the operation target 60b.

Further, the input apparatus 10 can appropriately respond the intention of the user to start the operation of the operation target 60b, by the use of the click sense generation mechanism of the tactile switch 12. Due to this click sense, the user can easily recognize that the operation of the operation target 60b is to be started. Further, the response using the click sense generated by the click-sense generation mechanism is directly performed not through the CPU 11, and hence the user can quickly receive the response using the click sense.

In addition, the input apparatus 10 can quickly respond the intention of the user to stop the operation of the operation target 60b, using the click sense. Due to this click sense, the user can easily recognize that the operation of the operation target 60b is stopped.

Now, an exemplary configuration of each section actually stored in the input apparatus 10 will be described.

Figure 8:
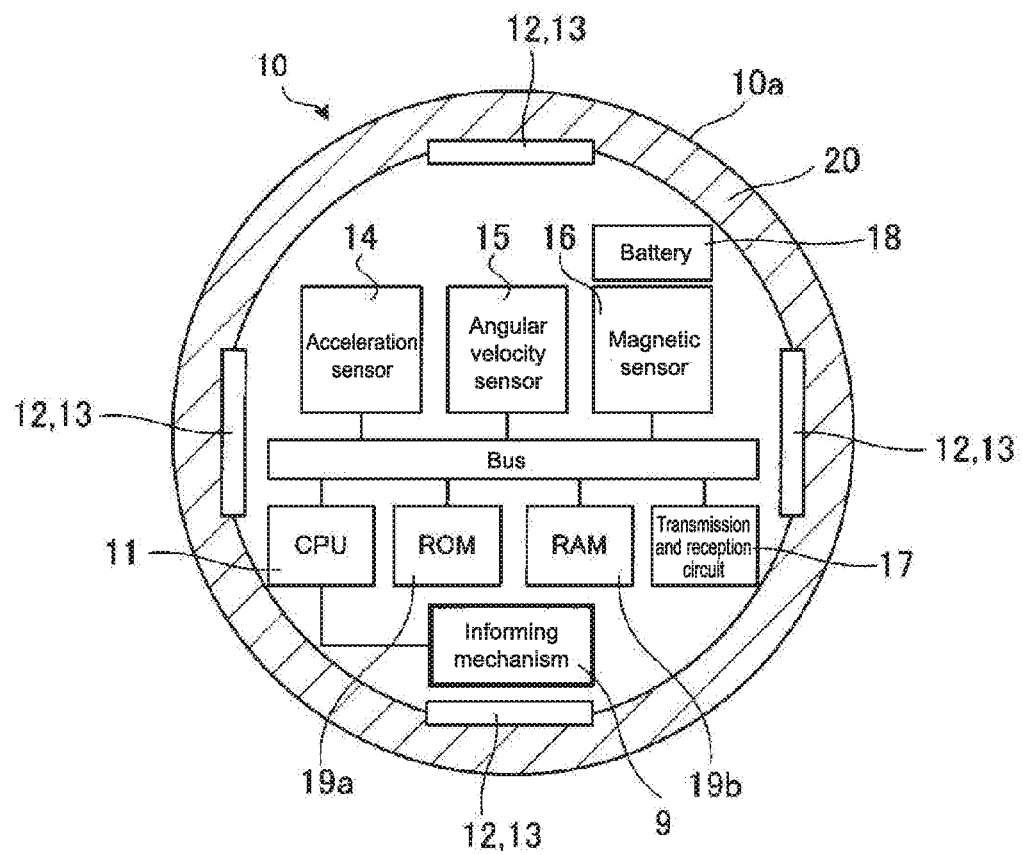
FIG. 8 is a block diagram showing an exemplary inner configuration of the input apparatus according to the embodiment of the present disclosure.

FIG. 8 is a block diagram showing an exemplary inner configuration of the input apparatus 10.

The CPU 11, the acceleration sensor 14, the angular velocity sensor 15, the magnetic sensor 16, the transmission and reception circuit 17, the ROM 19a, and the RAM 19b are mounted on the circuit board (not shown) as described above. The CPU 11, the acceleration sensor 14, the angular velocity sensor 15, the magnetic sensor 16, the transmission and reception circuit 17, the ROM 19a, and the RAM 19b are connected via a bus. The battery 18 and the circuit board on which the CPU 11 and the like are mounted are provided in the cavity formed inside the core portion 21 of the input apparatus main body 20 being a casing. The circuit board is fixed inside the cavity. The informing mechanism 9 provides information using, for example, a sound, a light, or a vibration as feedback about an input operation performed by the user.

The CPU 11 controls operations of the respective section housed in the input apparatus main body 20. Further, the CPU 11 obtains sensor data from each sensor at 100-Hz intervals, for example.

The acceleration sensor 14 detects acceleration in the three axes of the x-, y-, and z-axes that is generated in the input apparatus 10 and outputs acceleration values. The angular velocity sensor 15 detects angular velocities about the three axes of the x-, y-, and z-axes that are generated in the input apparatus 10 and outputs angular velocity values. The magnetic sensor 16 detects magnetism in the three axes of the x-, y-, and z-axes with respect to the input apparatus 10 and outputs magnetic values. The magnetic sensor 16 is used for determining an absolute position of the input apparatus 10 during calibration at the beginning. After that, a relative position of the input apparatus 10 can be calculated by the CPU 51 of the control apparatus 50 based on output values from the acceleration sensor 14 and the angular velocity sensor 15.

Examples of Angular Velocity of Operation Target

Next, examples in which the angular velocity of the operation target 60b is changed in accordance with the angular velocity of the input apparatus 10 that is detected by the angular velocity sensor 15 will be described with reference to FIGS. 9A to 11D.

Figure 9A:
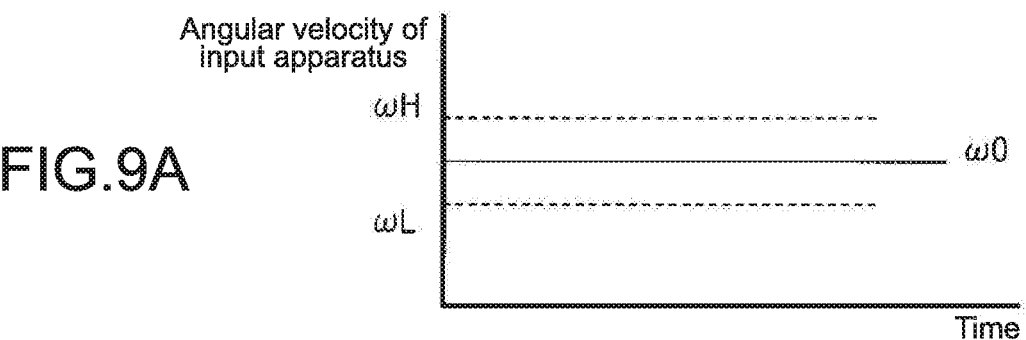
FIGS. 9A to 9D are explanatory diagrams showing a relationship between an angular velocity of the input apparatus according to the embodiment of the present disclosure and each of an angular velocity of an operation target displayed on a screen, a rotation angle of the operation target, and a timing of a feedback signal.
Figure 9B:
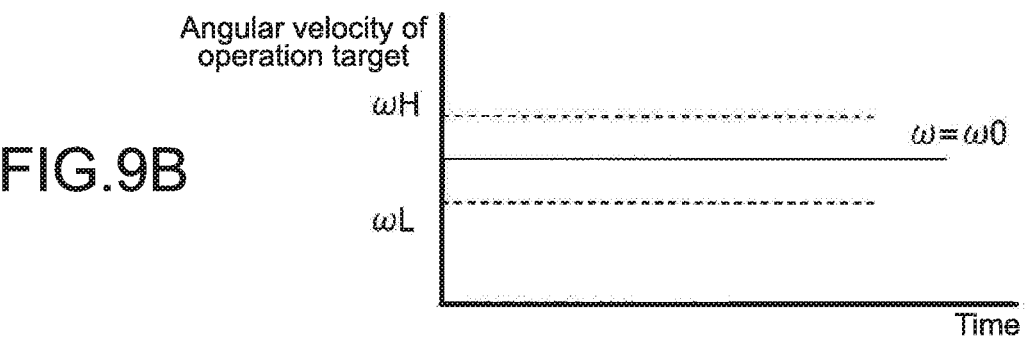
Figure 9C:
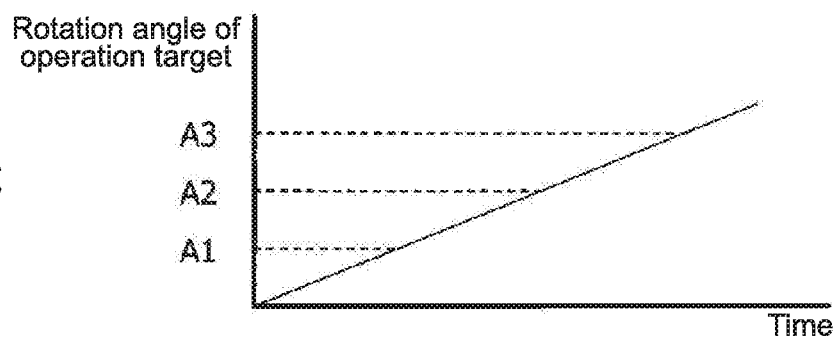
Figure 9D:
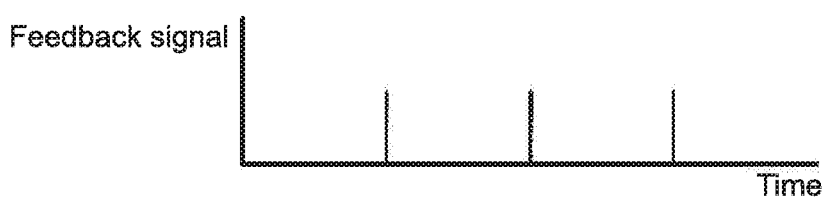

FIGS. 9A to 9D are explanatory diagrams showing a relationship between an angular velocity of the input apparatus 10 and each of an angular velocity of the operation target 60b displayed on the screen, a rotation angle of the operation target 60b, and a timing of a feedback signal. FIG. 9A shows an exemplary angular velocity of the input apparatus 10. FIG. 9B shows an exemplary angular velocity of the operation target 60b. FIG. 9C shows an exemplary rotation angle of the operation target 60b. FIG. 9D shows an exemplary feedback signal received by the input apparatus 10. Note that, the displacement value includes the angular velocity value outputted by the angular velocity sensor 15 housed in the input apparatus main body 20 as the first displacement amount. Further, a rotation angle and a rotation direction of the input apparatus 10 are determined based on the displacement value, and the second displacement amount is calculated based on the determined rotation angle and rotation direction of the input apparatus 10.

In FIG. 9A, an angular velocity threshold wL and an angular velocity threshold wH higher than the angular velocity threshold wL are set in advance. The input apparatus 10 is rotated at an angular velocity w0 falling within a range of from the angular velocity threshold wL and the angular velocity threshold wH.

In FIG. 9B, the input apparatus 10 rotates at the constant angular velocity w0 and the operation target 60b displayed on the display unit 60a rotates at a constant angular velocity w. Here, the angular velocity w of the operation target 60b is set to be equal to the angular velocity w0 of the input apparatus 10. Therefore, the operation target 60b rotating at the constant angular velocity w0 is displayed.

FIG. 9C shows the rotation angle of the operation target 60b. The symbols "A1," "A2," and "A3" of FIG. 9C are given for each predetermined angle. For example, the symbols "A1", "A2," and "A3" represent 30 degrees, 60 degrees, and 90 degrees, respectively. As shown in FIG. 9B, the angular velocity w of the operation target 60b is constant. Therefore, also the rotation angle of the operation target 60b increases monotonically.

FIG. 9D shows a timing of a feedback signal sent by the CPU 51 to the input apparatus 10, corresponding to the rotation angle of the operation target 60b. For example, it is assumed that feedback signals are sent at 30-degree intervals. In this case, the angular velocity of the operation target 60b is constant. Therefore, the feedback signals are sent in a constant cycle. The input apparatus 10 causes the informing mechanism 9 to provide the user with information at a timing at which the input apparatus 10 receives a feedback signal.

Now, exemplary operations performed by the user will be described.

The user grasps the input apparatus 10, indicating the intention to start the operation of the operation target 60b. Then, the tactile switch 12, the pressure sensor 13, the touch sensor (not shown), and the like detect that the input operation is to be started. The respective sensors output signals to the CPU 11. The CPU 11 executes averaging processing or the like on angular velocity values outputted by the angular velocity sensor 15 within a period in which the user performs the operation. After that, the CPU 11 sends the resulting angular velocity value to the control apparatus 50 through the transmission and reception circuit 17.

The CPU 51 executes an arithmetic operation (e.g., integral processing) based on the angular velocity value received from the input apparatus 10. Then, the CPU 51 performs control of displaying, on the display unit 60a, the operation target 60b rotated corresponding to an angle and a direction indicated by angle information obtained by the arithmetic operation. For this rotation of the operation target 60b, in order to inform the user operating the input apparatus 10 of the rotation of the operation target 60b for each rotation of the operation target 60b by a predetermined angle (e.g., 30 degrees), the CPU 51 sends a feedback signal to the input apparatus 10 through the transmission and reception circuit 52.

The input apparatus 10 receives the feedback signal from the control apparatus 50. The input apparatus 10 transmits the received feedback signal to the informing mechanism 9. The input apparatus 10 causes the informing mechanism 9 to inform the user of the rotation of the operation target 60b by the predetermined angle, using at least one of a sound, a light, and a vibration. In this manner, the user recognizes that the informing mechanism 9 has provided some information in any one of auditory, visual, and tactile manners. For example, it is assumed that the user starts rotating the input apparatus 10 and the informing mechanism 9 provides information three times. In this case, the user can recognize that the input apparatus 10 is rotated by 90 degrees from the initial state. Note that, by moving the operation target 60b at the constant angular velocity w0 when the angular velocity of the input apparatus 10 falls within the range of from the angular velocity threshold wH and the angular velocity threshold wL, it is also possible to prevent the operation target 60b from moving at an unintended angular velocity due to shaking or the like of the hand of the user.

Figure 10A:
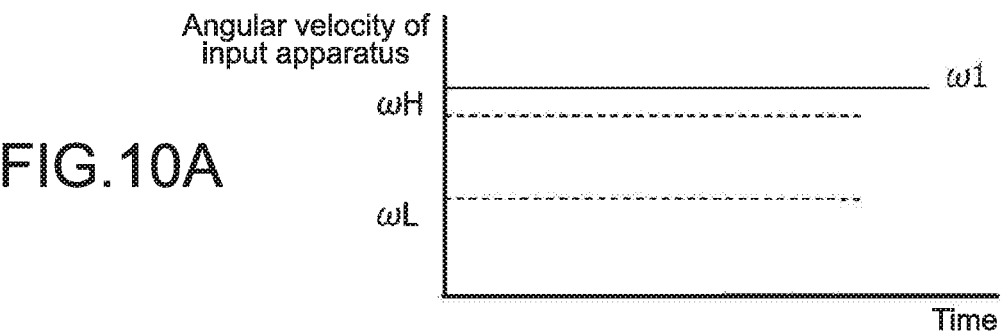
FIGS. 10A to 10D are explanatory diagrams showing exemplary operations of the operation target in the case where an angular velocity w1 of the input apparatus according to the embodiment of the present disclosure is made higher than an angular velocity threshold wH.
Figure 10B:
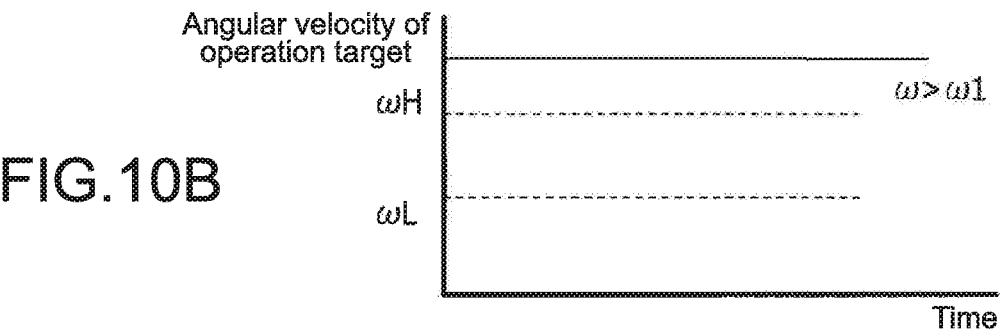
Figure 10C:
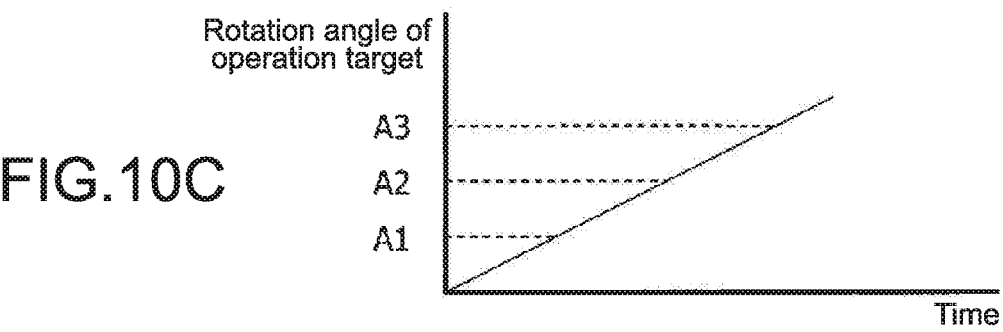
Figure 10D:
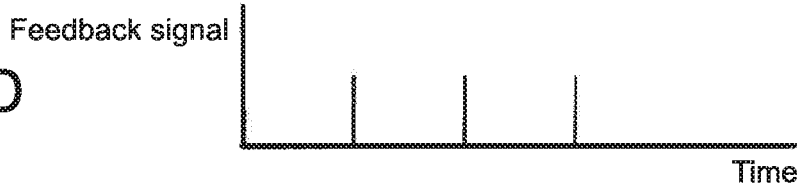

FIGS. 10A to 10D are explanatory diagrams showing exemplary operations of the operation target 60b in the case where the angular velocity w1 of the input apparatus 10 is made higher than the angular velocity threshold wH. In FIG. 10A, the angular velocity w1 of the input apparatus 10 is higher than the angular velocity threshold wH. In FIG. 10B, the angular velocity w of the operation target 60b is higher than the angular velocity w1 of the input apparatus 10. FIG. 10C shows an exemplary rotation angle of the operation target 60b. FIG. 10D shows an exemplary feedback signal received by the input apparatus 10. In FIGS. 10A to 10D, the description will be given assuming that the first displacement amount is the angular velocity w1 of the input apparatus 10 and a first displacement amount threshold is the angular velocity threshold wH.

When the angular velocity w1 of the input apparatus 10 becomes larger than the angular velocity threshold wH (FIG. 10A), the CPU 51 displays, on the display unit 60a, the operation target 60b such that the angular velocity w of the operation target 60b is higher than the angular velocity w1 of the input apparatus 10 (FIG. 10B). At this time, the operation target 60b rotates at a high velocity (FIG. 10C). Thus, the interval at which the control apparatus 50 sends a feedback signal to the input apparatus 10 is shorter than the interval shown in FIG. 9D.

Figure 11A:
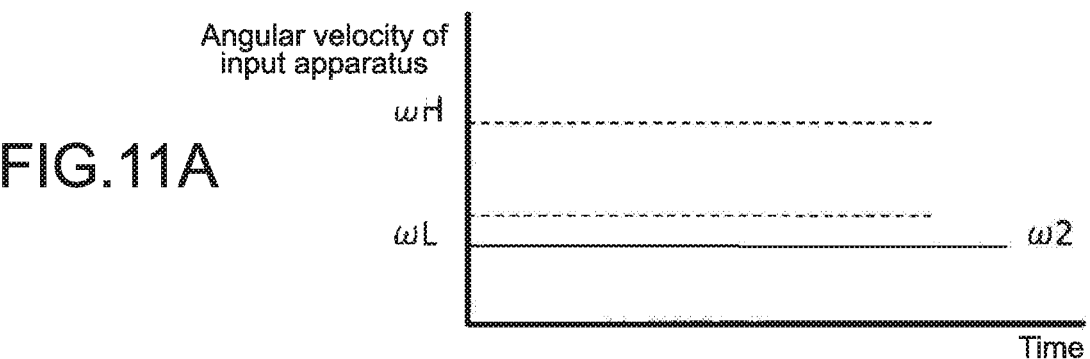
FIGS. 11A to 11D are explanatory diagrams showing exemplary operations of the operation target in the case where an angular velocity w2 of the input apparatus according to the embodiment of the present disclosure is made lower than an angular velocity threshold wL.
Figure 11B:
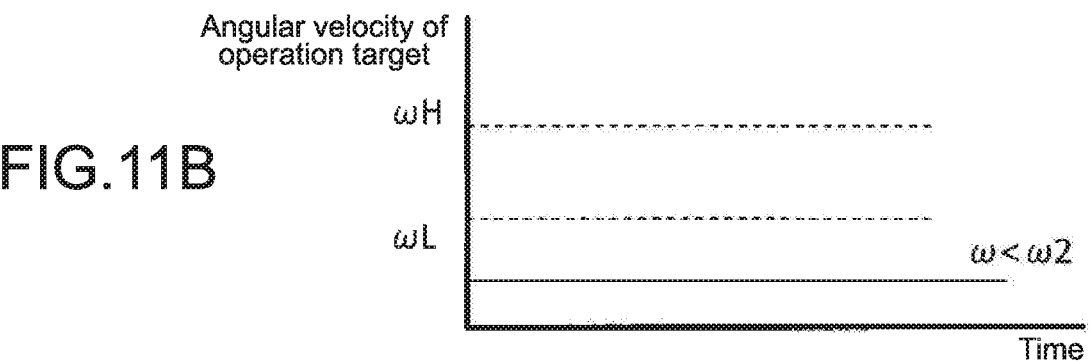
Figure 11C:
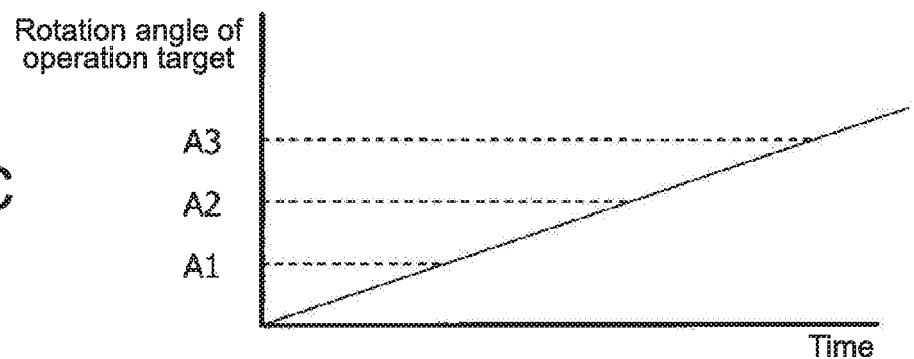
Figure 11D:
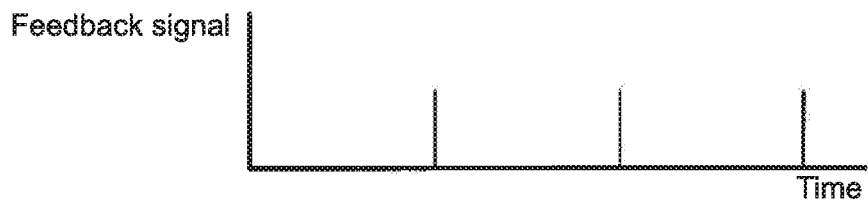

FIGS. 11A to 11D are explanatory diagrams showing exemplary operations of the operation target 60b in the case where the angular velocity w2 of the input apparatus 10 is made lower than the angular velocity threshold wL. In FIG. 11A, the angular velocity w2 of the input apparatus 10 is lower than the angular velocity threshold wL. In FIG. 11B, the angular velocity w of the operation target 60b is lower than the angular velocity w2 of the input apparatus 10. FIG. 11C shows an exemplary rotation angle of the operation target 60b. FIG. 11D shows an exemplary feedback signal received by the input apparatus 10. In FIGS. 11A to 11D, the description will be given assuming that the first displacement amount is the angular velocity w2 of the input apparatus 10 and the first displacement amount threshold is the angular velocity threshold wL.

When the angular velocity of the input apparatus 10 becomes smaller than the angular velocity threshold wL (FIG. 11A), the CPU 51 displays, on the display unit 60a, the operation target 60b such that the angular velocity w of the operation target 60b is lower than the angular velocity w2 of the input apparatus 10 (FIG. 11B). At this time, the operation target 60b rotates at a low velocity (FIG. 11C). Thus, the interval at which the control apparatus 50 sends a feedback signal to the input apparatus 10 is longer than the interval shown in FIG. 9D.

Exemplary Velocity of Operation Target

Next, an example in which the velocity of the operation target 60b is changed depending on the velocity of the input apparatus 10 that is calculated by integrating the acceleration detected by the acceleration sensor 14 will be described with reference to FIGS. 12A to 14D.

Figure 12A:
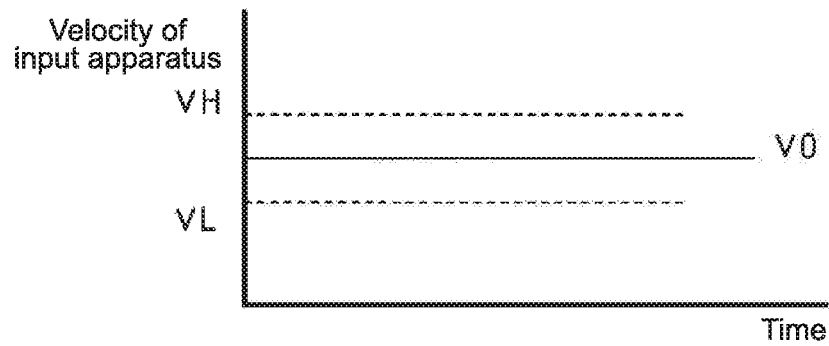
FIGS. 12A to 12D are explanatory diagrams showing a relationship between a velocity of the input apparatus according to the embodiment of the present disclosure and each of a velocity of the operation target displayed on the screen, a distance of the operation target, and a timing of a feedback signal.
Figure 12B:
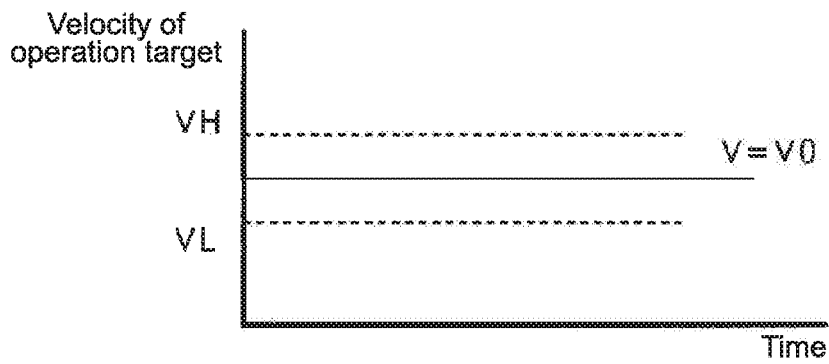
Figure 12C:
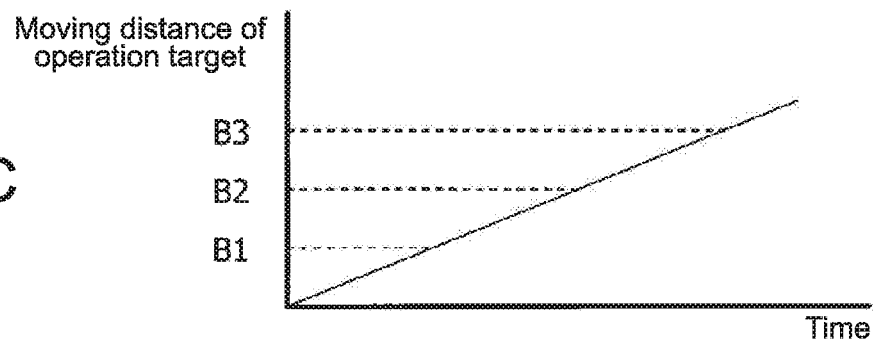
Figure 12D:
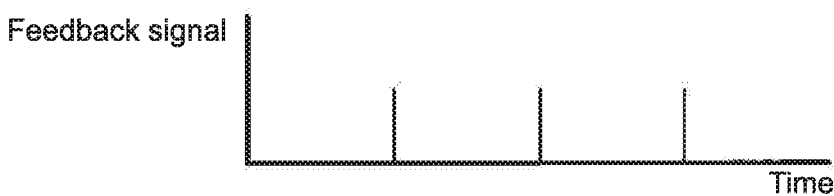

FIGS. 12A to 12D are explanatory diagrams showing a relationship between the velocity of the input apparatus 10 and each of the velocity of the operation target 60b displayed on the screen, the distance of the operation target 60b, and a timing of a feedback signal. FIG. 12A shows an exemplary velocity of the input apparatus 10. FIG. 12B shows an exemplary velocity of the operation target 60b. FIG. 12C shows an exemplary moving distance of the operation target 60b. FIG. 12D shows an exemplary feedback signal received by the input apparatus 10. Note that, the displacement value includes the acceleration value outputted by the acceleration sensor 14 housed in the input apparatus main body 20 as the first displacement amount. Further, a velocity and a moving distance of the input apparatus 10 are determined based on the displacement value, and the second displacement amount having a variable ratio to the first displacement amount is calculated based on the determined velocity and moving distance of the input apparatus 10.

In FIG. 12A, a velocity threshold VL and a velocity threshold VH higher than the velocity threshold VL are set in advance. The input apparatus 10 is moved at a velocity V0 falling within a range of from the velocity threshold VL to the velocity threshold VH.

In FIG. 12B, the input apparatus 10 moves at the constant velocity V0 and the operation target 60b displayed on the display unit 60a moves at a constant velocity V. Here, the velocity V of the operation target 60b is set to be equal to the velocity V0 of the input apparatus 10. Therefore, the operation target 60b moving at the constant velocity V0 is displayed.

FIG. 12C shows the moving distance of the operation target 60b calculated by integrating the velocity of the operation target 60b. The symbols "B1," "B2," and "B3" of FIG. 12C are given for each predetermined distance. For example, the symbols "B1," "B2," and "B3" represent 15 cm, 30 cm, and 45 cm, respectively. As shown in FIG. 12B, the velocity V of the operation target 60b is constant. Therefore, the moving distance of the operation target 60b increases monotonically.

FIG. 12D shows a timing at which the CPU 51 sends a feedback signal to the input apparatus 10, corresponding to the moving distance of the operation target 60b. For example, it is assumed that feedback signals are sent at each 15-cm intervals. In this case, the velocity of the operation target 60b is constant. Therefore, the feedback signals are sent in a constant cycle. The input apparatus 10 causes the informing mechanism 9 to provide the user with information at a timing at which the input apparatus 10 receives a feedback signal.

Now, exemplary operations performed by the user will be described.

The user grasps the input apparatus 10, indicating the intention to start the operation of the operation target 60b. Then, the tactile switch 12, the pressure sensor 13, the touch sensor (not shown), and the like detect that the input operation is to be started. The respective sensors output signals to the CPU 11. The CPU 11 executes averaging processing or the like on acceleration values outputted by the acceleration sensor 14 within a period in which the user performs the operation. After that, the CPU 11 sends the resulting acceleration value to the control apparatus 50 through the transmission and reception circuit 17.

The CPU 51 executes an arithmetic operation (e.g., integral processing) based on the acceleration value received from the input apparatus 10 to determine the velocity V0 of the input apparatus 10. Then, the CPU 51 performs control of displaying, on the display unit 60a, the operation target 60b moved corresponding to a moving distance obtained by the arithmetic operation. For this movement of the operation target 60b, in order to inform the user operating the operation target 60b of the movement of the operation target 60b for each movement of the operation target 60b by a predetermined distance (e.g., 15 cm), the CPU 51 sends a feedback signal to the input apparatus 10 through the transmission and reception circuit 52.

The input apparatus 10 receives the feedback signal from the control apparatus 50. The input apparatus 10 transmits the received feedback signal to the informing mechanism 9. The input apparatus 10 causes the informing mechanism 9 to inform the user of the movement of the operation target 60b by the predetermined distance using at least one of a sound, a light, and a vibration. In this manner, the user recognizes that the informing mechanism 9 has provided some information in any one of auditory, visual, and tactile manners. For example, it is assumed that the user starts moving the input apparatus 10 and the informing mechanism 9 provides information three times. In this case, the user can recognize that the input apparatus 10 is moved by 45 cm from the initial state. Note that, by moving the operation target 60b at the constant velocity V0 when the velocity of the input apparatus 10 falls within the range of from the velocity threshold VH and the velocity threshold VL, it is also possible to prevent the operation target 60b from moving at an unintended velocity due to shaking or the like of the hand of the user.

Figure 13A:
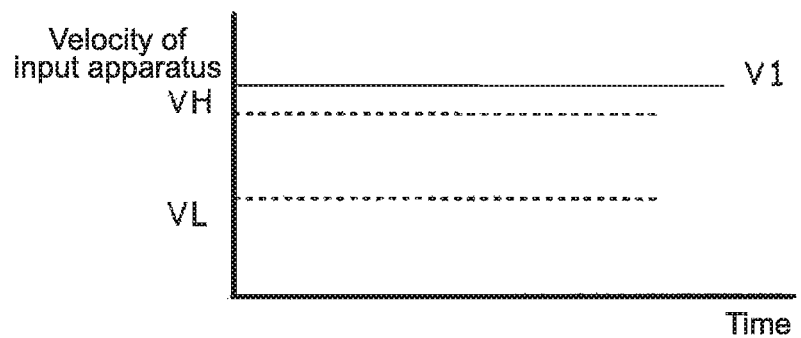
FIGS. 13A to 13D are explanatory diagrams showing exemplary operations of the operation target in the case where a velocity V1 of the input apparatus according to the embodiment of the present disclosure is made higher than a velocity threshold VH.
Figure 13B:
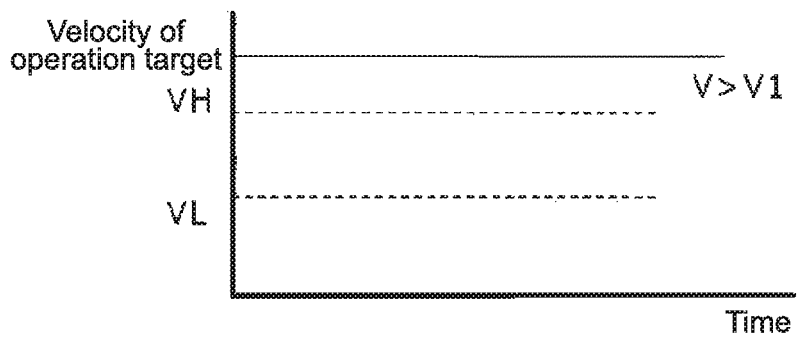
Figure 13C:
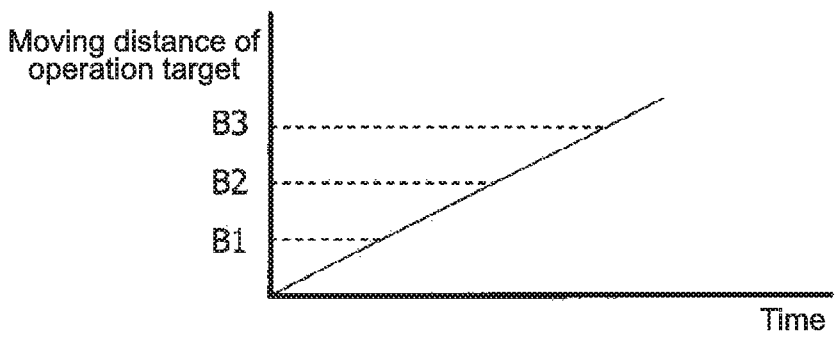
Figure 13D:
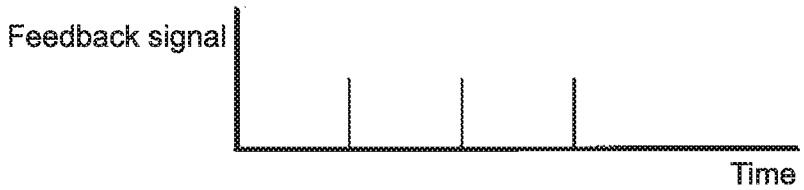

FIGS. 13A to 13D are explanatory diagrams showing exemplary operations of the operation target 60b in the case where the velocity V1 of the input apparatus 10 is made higher than the velocity threshold VH. In FIG. 13A, the velocity of the input apparatus 10 is higher than the velocity threshold VH. In FIG. 13B, the velocity V of the operation target 60b is higher than the velocity V1 of the input apparatus 10. FIG. 13C shows an exemplary moving distance of the operation target 60b. FIG. 13D shows an exemplary feedback signal received by the input apparatus 10. In FIGS. 13A to 13D, the description will be given assuming that the first displacement amount is the velocity V1 calculated based on the acceleration of the input apparatus 10 and the first displacement amount threshold is the velocity threshold VH.

When the velocity V1 of the input apparatus 10 becomes higher than the velocity threshold VH (FIG. 13A), the CPU 51 displays the operation target 60b on the display unit 60a such that the velocity V of the operation target 60b is higher than the velocity V1 of the input apparatus 10 (FIG. 13B). At this time, the operation target 60b moves at a high velocity (FIG. 13C). Thus, the interval at which the control apparatus 50 sends a feedback signal to the input apparatus 10 is shorter than the interval shown in FIG. 12D.

Figure 14A:
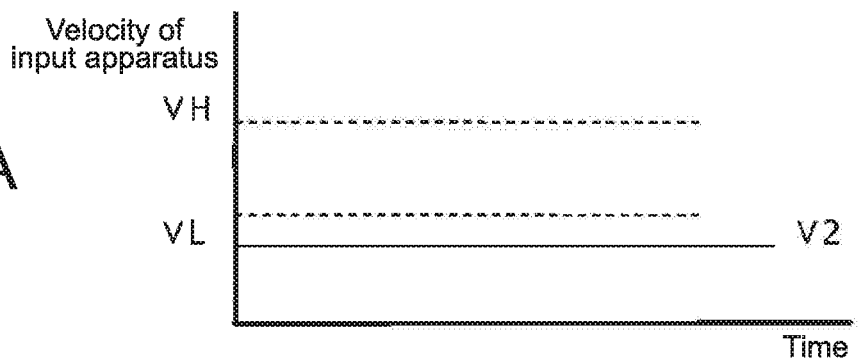
FIGS. 14A to 14D are explanatory diagrams showing exemplary operations of the operation target in the case where a velocity V2 of the input apparatus according to the embodiment of the present disclosure is made lower than a velocity threshold VL.
Figure 14B:
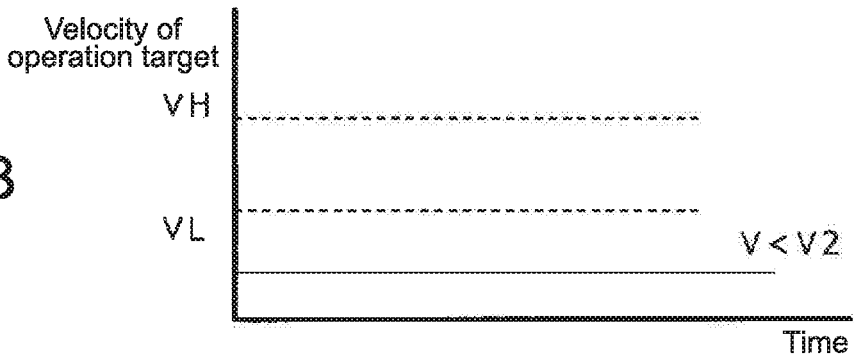
Figure 14C:
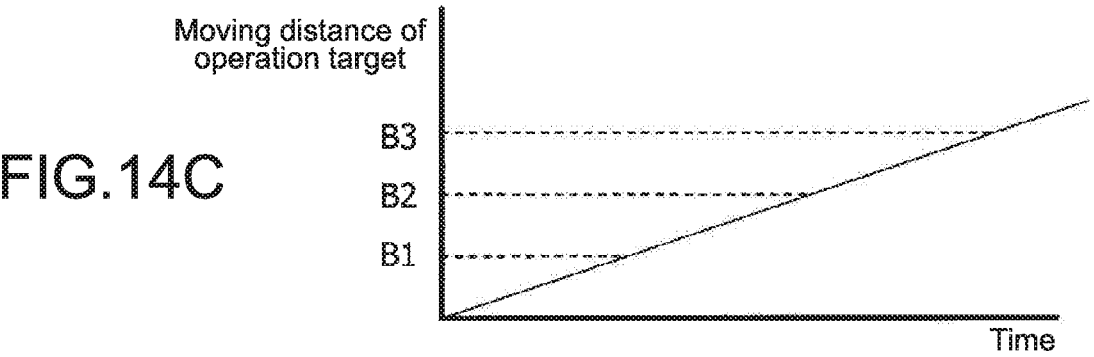
Figure 14D:
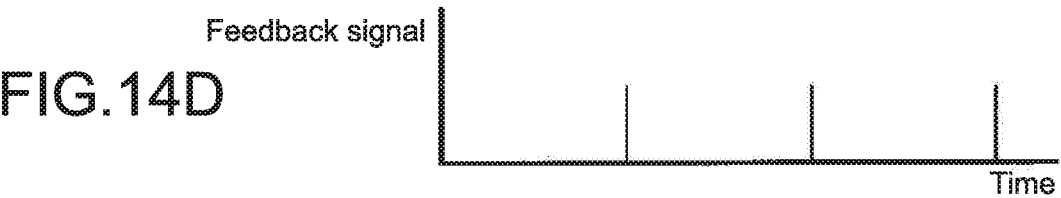

FIGS. 14A to 14D are explanatory diagrams showing exemplary operations of the operation target 60b in the case where a velocity V2 of the input apparatus 10 is made lower than the velocity threshold VL. In FIG. 14A, the velocity of the input apparatus 10 is lower the velocity threshold VL. In FIG. 14B, the velocity V of the operation target 60b is lower than the velocity V2 of the input apparatus 10. FIG. 14C shows an exemplary moving distance of the operation target 60b. FIG. 14D shows an exemplary feedback signal received by the input apparatus 10. In FIGS. 14A to 14D, the description will be given assuming that the first displacement amount is the velocity V2 calculated based on the acceleration of the input apparatus 10 and the first displacement amount threshold is the velocity threshold VL.

When the velocity V2 of the input apparatus 10 becomes smaller than the velocity threshold VL (FIG. 14A), the CPU 51 displays the operation target 60b on the display unit 60a such that the velocity V of the operation target 60b is lower than the velocity V2 of the input apparatus 10 (FIG. 14B). At this time, the operation target 60b moves at a low velocity (FIG. 14C). Thus, the interval at which the control apparatus 50 sends a feedback signal to the input apparatus 10 is longer than the interval shown in FIG. 12D.

Example of Operation Target

Examples of the operation target 60b include goods sold on the Internet and displayed on a screen. By operating the input apparatus 10, the user can see the goods in any direction in a three-dimensional space, such as upper and lower directions, left- and right-hand directions, and front and back directions to consider buying. Otherwise, for example, applying the present technology for simulating a room layout, the user can move furniture as the operation target 60b and change the orientation of the furniture. Now, other examples of the operation target 60b will be described.

Figure 15:
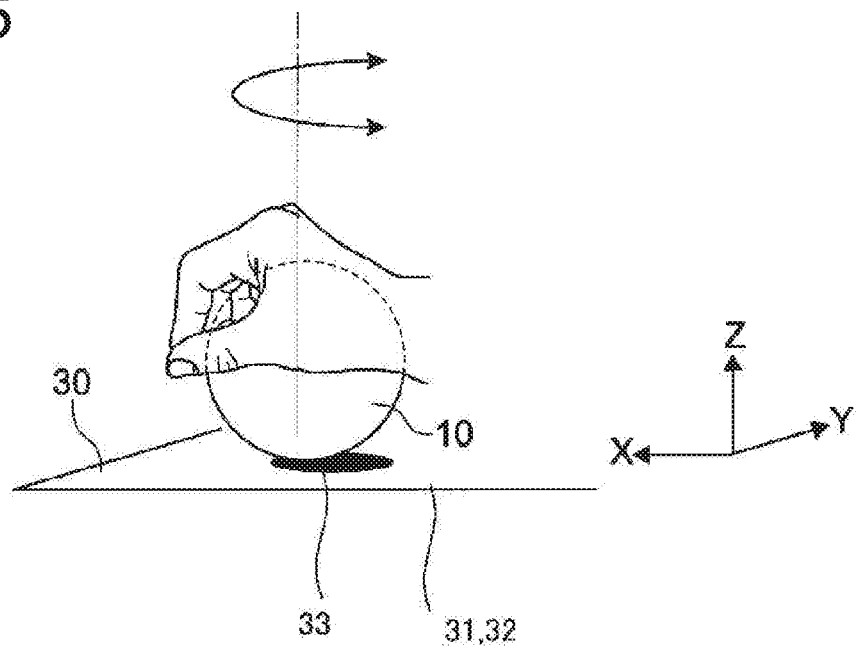
FIG. 15 is an explanatory diagram showing an exemplary operation when sound volume and the like are controlled with the input apparatus being overlapped on an operation table according to the embodiment of the present disclosure.

FIG. 15 is an explanatory diagram showing exemplary operations for controlling sound volume and the like with the input apparatus 10 being overlapped on an operation table 30.

The operation table 30 incorporates a display screen 31 and a touch panel 32. A plurality of icons 33 are displayed on the display screen 31. The icons 33 enable the sound volume control, various settings, and the like to be performed. For example, the icons 33 are displayed in a knob form. The input apparatus 10 is overlapped on the operation table 30, corresponding to the position of one of the icons 33. Then, the operation table 30 senses the position at which the input apparatus 10 is placed due to the touch panel 32. Therefore, the operation table 30 can identify which one of the icons 33 is to be operated.

When the input apparatus 10 is rotated while the input apparatus 10 is placed on the operation table 30, the operation table 30 sends a feedback signal to the input apparatus 10 such that the input apparatus 10 blips every time the input apparatus 10 rotates by 30 degrees, for example. With this, the user can recognize a change of the settings using the icon 33. At this time, when the input apparatus 10 is rotated to the right or the left or as a setting value of the icon 33 is increased, the kind of the feedback signal may be changed to change the sound.

There are cases where the icon 33 is small and hidden by the overlapped input apparatus 10 and the user cannot see the icon 33, and where a display of the rotation angle of the icon 33 is different from an actual rotation angle of the input apparatus 10 and the icon 33 is not rotated. However, even in such cases, the user can perform a desired setting due to the feedback. Further, in the case where the icon 33 is small, feedback may be provided at a time when the position at which the user places the input apparatus 10 on the screen corresponds to the position of the displayed icon 33. With this, the user can reliably recognize that the user has placed the input apparatus 10 on the icon 33.

Further, when the angular velocity detected by the input apparatus 10 is lower than the angular velocity threshold wL, the operation table 30 may consider that the user wishes to finely control the icon 33 and may operate the icon 33 such that the setting value slowly changes. At this time, the angular velocity of the rotated operation target 60b is lower than an actually detected angular velocity of the input apparatus 10. With this, fine control can be performed even at too low angular velocity to detect by the input apparatus 10 and usability is enhanced. Further, if the sound (feedback) during such an operation is changed, the user recognizes the fine control, which further enhances the usability. Further, if the setting value being changed using the icon 33 is displayed on the display screen 31 as a numerical value, it becomes easier for the user to recognize the change of the setting value.

Further, in the case where the icon 33 is displayed in the knob form, the knob is operated to rotate in parallel to a display surface of the display screen 31. Here, the amount of displacement calculated based on this rotation angle may be reflected on a one-axis slider or the like displayed at another position in the display screen 31. In this manner, parameters variable by the icons 33 may be displayed and used for changing other setting values, for example.

Further, as an example in which the display screen 31 and the touch panel 32 are not used, there may be an input apparatus 10 having a regular hexahedron shape and having faces with numbers from "1" to "6" like a die. In this example, an example in which a television receiver is operated will be described.

For example, by placing the input apparatus 10 with the face of the number "1" being a top face and rotating the input apparatus 10 to the right, the input apparatus 10 is powered on. Otherwise, by rotating the input apparatus 10 to the left, the input apparatus 10 is powered off.

In turn, by placing the input apparatus 10 with the face of the number "2" being the top face and rotating the input apparatus 10 to the right, a channel number is counted up. Otherwise, by rotating the input apparatus 10 to the left, the channel number is counted down.

In turn, by placing the input apparatus 10 with the face of the number "3" being the top face and rotating the input apparatus 10 to the right, the sound volume increases. Otherwise, by rotating the input apparatus 10 to the left, the sound volume decreases.

Similarly, the faces of the numbers from "4" to "6" are assigned other input operations.

At this time, if the input apparatus 10 generates some feedback such as a vibration at the same time of power-on/off or sound volume up/down, the user can recognize that the settings of the television receiver change. Of course, in addition to the feedback, a changed channel number or a set sound volume value may be displayed on the display screen 31.

Figure 16A:
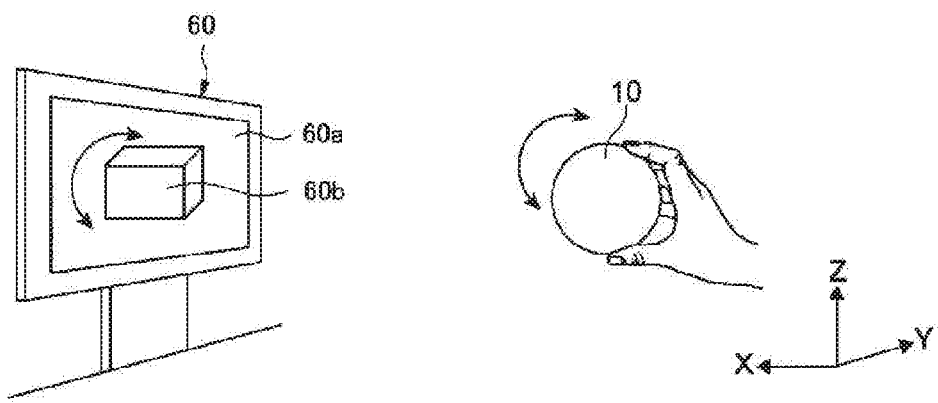
FIGS. 16A and 16B are explanatory diagrams showing an exemplary operation of rotating a screw with a driver displayed as the operation target according to the embodiment of the present disclosure.
Figure 16B:
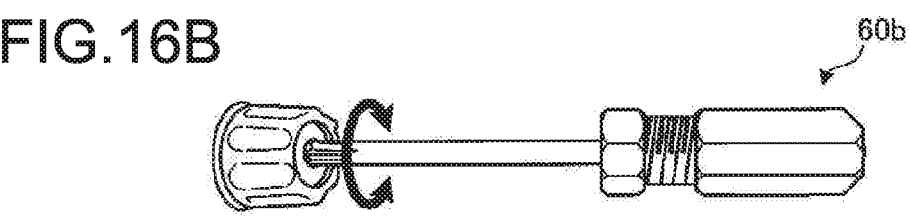

FIGS. 16A and 16B are explanatory diagrams showing exemplary operations of rotating a screw with a driver displayed as the operation target 60b. FIG. 16A shows an exemplary operation of the input apparatus 10. FIG. 16B shows an example of operating the driver displayed as the operation target 60b.

In general, when the driver is rotated for tightening a screw, the driver is rotated without resistance at the beginning. However, once the screw is inserted to some degree, a resistance is applied to the driver and the screw does not rotate anymore. The operation target 60b of FIGS. 16A and 16B virtualizes such a motion of the driver.

Here, the description will be given assuming that the first displacement amount is the angular velocity of the input apparatus 10 and the second displacement amount is the angular velocity of the operation target 60b. At this time, depending on the kind of the operation target 60b, the second displacement amount gradually decreases even when the angular velocity of the input apparatus 10 is constant and the interval at which feedback is provided is increased corresponding to the gradually decreasing second displacement amount. Therefore, the interval at which the informing mechanism 9 provides information is increased.

Here, the user holds and lightly grasps the input apparatus 10 and enables the operation. After that, the user performs an operation of rotating the input apparatus 10 to the right (FIG. 16A). At this time, the driver displayed as the operation target 60b also rotates to the right on the screen and the screw is tightened on the screen.

At the beginning, the driver rotates at the same angular velocity as that of the input apparatus 10. However, as the screw is tightened, the angular velocity of the driver gradually decreases. For example, even when the input apparatus 10 rotates at a constant angular velocity, the angular velocity of the driver gradually decreases, for example, 80%, 60%, 40%, and so on. Thus, the interval at which the feedback is provided is gradually increased, which can express that the torque rotating the screw increases. Finally, the angular velocity of the driver becomes 0 even when the input apparatus 10 is rotated. Then, the user can recognize that the screw is completely tightened.

Note that, if the operation target 60b rotates about one axis, the CPU 51 can ignore small rotation and motion about/in axes other than the desired axis. With this, a habit of moving the hand, shaking of the hand, and the like can be eliminated and an operation of the driver that is based on a user's sense can be expressed.

Alternatively, depending on the kind of the operation target 60b, even when the first displacement amount is constant, the second displacement amount may gradually increase and the interval at which feedback is provided is reduced corresponding to the gradually increasing second displacement amount. Therefore, the interval at which the informing mechanism 9 provides information may be reduced. Although, in FIGS. 16A and 16B, the first and second displacement amounts are the angular velocities, those displacement amounts may be the velocities calculated based on the acceleration.

Alternatively, a flywheel may be provided inside the input apparatus 10. In this case, due to gyroscopic effect, the user holding the input apparatus 10 may feel a change in weight of the input apparatus 10. With this, for example, when the operation target 60b reduces the rotation speed, the user can feel the change in weight of the input apparatus 10.

Figure 17A:
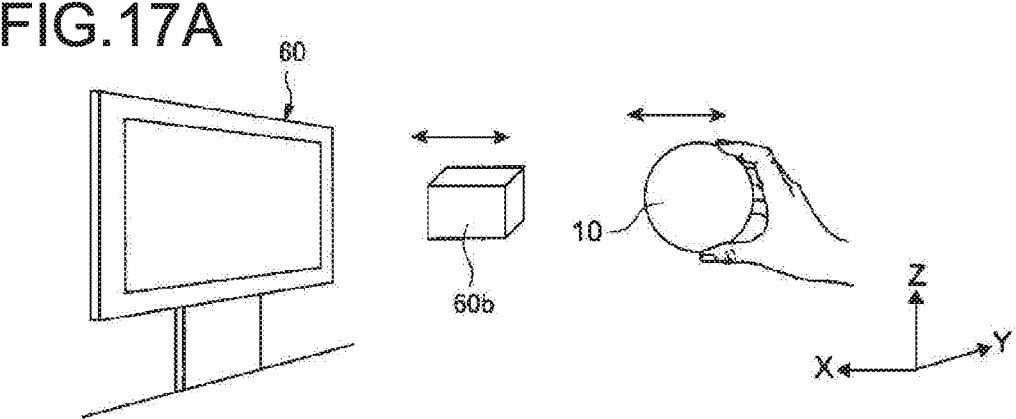
FIGS. 17A to 17C are explanatory diagrams showing an exemplary operation of moving a clockwork toy displayed as the operation target according to the embodiment of the present disclosure.
Figure 17B:
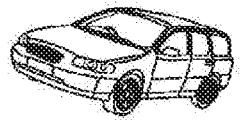
Figure 17C:
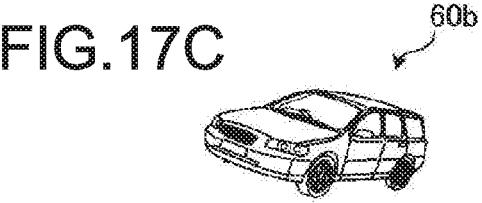

FIGS. 17A to 17C are explanatory diagrams showing an example in which a clockwork toy displayed as the operation target 60b is moved. FIG. 17A shows an exemplary operation of the input apparatus 10. FIGS. 17B and 17C each show an example in which the clockwork toy displayed as the operation target 60b is operated.

The user holds and gently grasps the input apparatus 10 and enables the operation. After that, the user moves the input apparatus 10 to the right. Then, an image in which the toy being the operation target 60b is also moved to the right and the spring of the toy is winded is displayed. At this time, even if the user moves the input apparatus 10 at almost a constant velocity, the velocity of movement of the toy being the operation target 60b gradually decreases as the toy is winded. The velocity of movement of the toy decreases and the interval at which feedback is provided is increased. With this, the user can feel that the force for winding the spring increases. Finally, the toy does not move anymore even when the user moves the input apparatus 10. With this, the user can recognize that the spring is completely winded up. When the user reduces the force with which the user grasps the input apparatus 10, the toy starts to run to the left at a high speed.

If the rotation angle, the amount of movement, etc. of the operation target 60b are different from the actual rotation angle, the actual amount of movement, etc. of the input apparatus 10, more intuitive operations can be achieved, which may be favorable to the user.

With the input apparatus 10 according to the embodiment described above, the CPU 51 used as the display controller displays, on the display apparatus 60, the operation target 60b displaced by the second displacement amount that emphasizes the first displacement amount. With this, it becomes easy to reflect the operation intended by the user on the displacement of the operation target 60b displayed on the display apparatus 60. Thus, the feedback is appropriately provided. Therefore, the user can operate the operation of the operation target 60b without any stress.

Here, the displacement value corresponding to the first displacement amount includes the angular velocity value. When the angular velocity of the input apparatus 10 departs from the range of from the angular velocity threshold wH to the angular velocity threshold wL, the operation target 60b rotating at a angular velocity that emphasizes the angular velocity of the input apparatus 10 is displayed. At this time, the informing mechanism 9 provides information to the user for each predetermined rotation angle. Thus, it becomes easy for the user to grasp the operation of the operation target 60b.

Further, the displacement value corresponding to the first displacement amount includes the acceleration value. By integrating the acceleration value, the velocity and the moving distance of the input apparatus 10 can be calculated. When the velocity of the input apparatus 10 departs from the range of from the velocity threshold VH to the velocity threshold VL, the operation target 60b moving at a velocity that emphasizes the velocity of the input apparatus 10 is displayed. At this time, the informing mechanism 9 provides information to the user for each predetermined moving distance. Thus, it becomes easy for the user to grasp the operation of the operation target 60b.

Further, depending on the kind of the operation target 60b, a threshold can be appropriately changed. Thus, an operational feeling as if the user directly operates the operation target can be given to the user.

Further, the input apparatus 10 has a spherical shape, and hence the input apparatus 10 may also be used for entertainment including a ball game and the like. When the input apparatus 10 is employed in a ball game such as playing catch, soccer, and golf, the user can throw the input apparatus 10. In this case, in order to prevent the input apparatus 10 from going far, a strap may be attached to the input apparatus 10, a net may be set before the user, or the user may insert a hand or a leg into a bag containing the input apparatus 10. Then, the input apparatus 10 may detect a rotation angle, acceleration, and the like. A direction and carry may be determined based on the rotation angle, the acceleration, and the like. A calculation result may be displayed on the display apparatus 60.

2. Modified Example

Exemplary Configuration of Display Apparatus

Note that, although, in the above-mentioned embodiment, the control apparatus 50 controls a display of the operation of the operation target 60*b* displayed on the display apparatus 60, a display apparatus 70 may independently control the operation. Now, an exemplary configuration of the display apparatus 70 will be described.

Figure 18A:
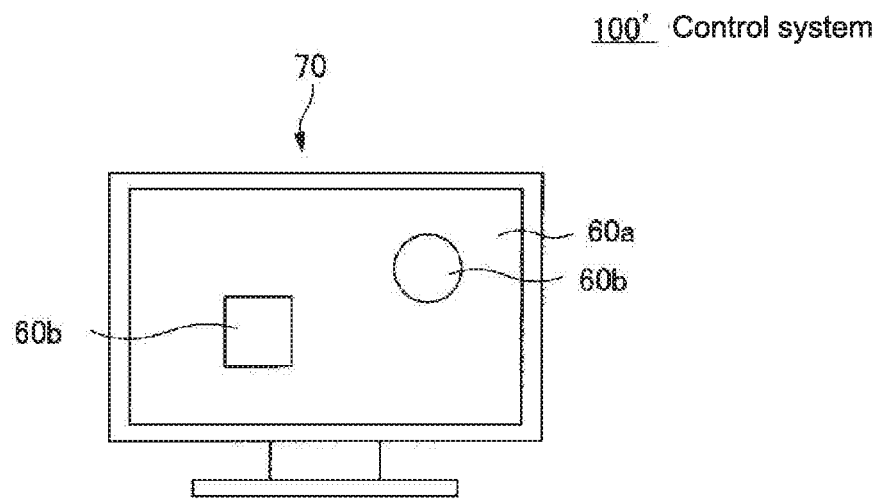
FIGS. 18A and 18B are explanatory and block diagrams respectively showing a display apparatus according to a modified example of the present disclosure and an exemplary inner configuration of the display apparatus.
Figure 18B:
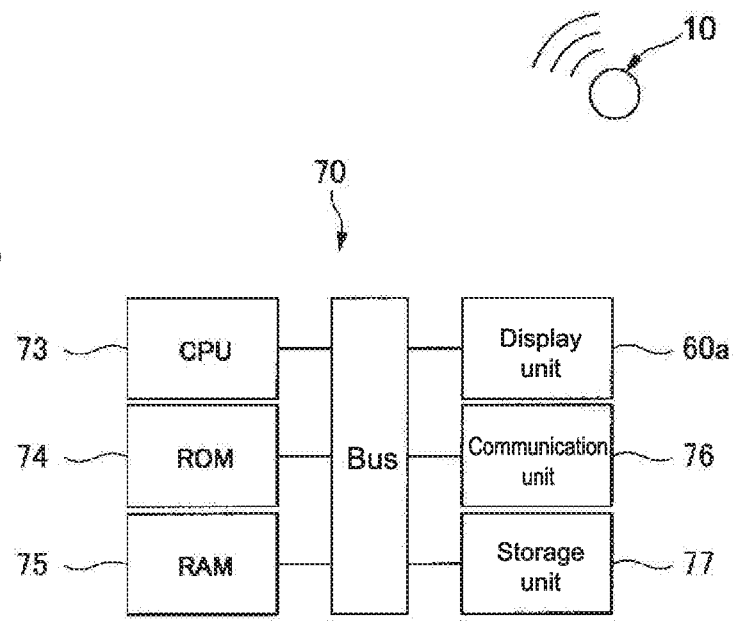

FIG. 18A shows an exemplary configuration of a control system 100'. FIG. 18B shows an exemplary inner configuration of the display apparatus 70.

The display apparatus 70 includes a display unit 60*a*. The display apparatus 70 is a display-integrated computer apparatus having general computer apparatus functions. A circular icon and a square icon are displayed as operation targets 60*b* on the display unit 60*a*. An input apparatus 10 in an operable state is placed before the display apparatus 70 (FIG. 18A).

The display apparatus 70 includes the display unit 60*a*, a CPU 73, a ROM 74, a RAM 75, a communication unit 76, and a storage unit 77.

The ROM 74 is a non-volatile memory. Various programs necessary for processing of the CPU 73 are stored in the ROM 74. The RAM 75 is a volatile memory. The RAM 75 is used as a work area for the CPU 73.

The communication unit 76 includes an antenna or the like (not shown). The communication unit 76 receives various types of information from the input apparatus 10. The communication unit 76 is also capable of sending a signal to the input apparatus 10.

The CPU 73 executes processing of the respective sections of the display apparatus 70. The CPU 73 can perform control similar to the CPU 51 of the above-mentioned control apparatus 50. The CPU 73 receives various types of information from the communication unit 76 and controls an operation target displayed by the display unit 60*a* based on the received information.

The display apparatus 70 further includes an operation unit (not shown). The operation unit is, for example, a keyboard. The user uses the operation unit to perform settings such as initial settings and specific settings. The operation unit receives various instructions from the user and outputs inputted signals to the CPU 73.

In this manner, the display apparatus 70 has a configuration in which the control apparatus 50 is integrated with the above-mentioned display apparatus 60. Thus, the configuration of the control system 100' can be simplified.

Other Modified Example

The ratio of the amount of movement of the input apparatus 10 to the amount of movement of the operation target 60*b* does not need to be fixed. Also in this case, the user can easily grasp the movement of the operation target 60*b* based on feedback to the input apparatus 10, a change of a value displayed on the display unit 60*a*, or the like.

The distance between the input apparatus 10 and the display apparatus 60 does not influence the operational feeling, and hence the distance may be arbitrarily set. For example, the input apparatus 10 may be used as a remote controller for operating a robot arm, a crane, or the like and the actually moving robot arm, crane, or the like may be displayed on the display apparatus 60.

Alternatively, the informing mechanism 9 may change light color or brightness of a screen on which an operation target is displayed. In addition, feedback using a sound from a speaker mounted on the screen may be provided. Alternatively, the feedback may be provided by providing the user with different information corresponding to the three axes of the angular velocity or the acceleration. For example, light color, light brightness, sound tone, and sound volume may differ for each axis. Further, the kind of information may be changed for each axis: for example, a light for the x-axis; a sound for the y-axis; and a vibration for the z-axis.

The operation target 60*b* is a virtual object displayed on a screen. Any object may be displayed as the operation target 60*b* and may be operated. Therefore, even the user who is unaccustomed to the operation of a computer apparatus can intuitively operate the operation target 60*b*.

Although the input apparatus 10 (input apparatus main body 20) has a spherical shape as an outer shape, the input apparatus 10 may have a shape other than the spherical shape. For example, the input apparatus 10 may have a regular polyhedron shape or a semiregular polyhedron shape, which is a non-directional (symmetrical) shape.

Although the input apparatus 10 can use nine-axis sensor data, the input apparatus 10 does not need to constantly use all of the nine-axis sensor data. The input apparatus 10 may retrieve part of the nine-axis sensor data and use the partial data for the operation of the operation target 60*b*.

A series of processes in the above-mentioned embodiment may be executed by a computer in which programs configuring software are incorporated in dedicated hardware or by a computer installing programs for executing respective functions. For example, programs configuring desired software may be installed in a general-purpose computer or the like and may be executed.

Alternatively, a recording medium recording program codes of software to implement the functions of the above-mentioned embodiment may be provided to a system or an apparatus. It is needless to say that also when a computer (or control apparatus such as CPU) of the system or the apparatus reads and executes the program codes stored in the recording medium, the functions are realized.

In this case, examples of the recording medium for providing the program codes may include a flexible disk, a hard disk, an optical disc, a magneto-optical disc, a compact disc read only memory (CD-ROM), a compact disc recordable (CD-R), a magnetic tape, a non-volatile memory card, and a ROM.

Further, by the computer executing the read program codes, the functions of the above-mentioned embodiment are realized. In addition, according to instructions of the program codes, an OS and the like operating on the computer execute part or all of actual processes. There is also a case where the functions of the above-mentioned embodiment are realized by those processes.

It should be appreciated that the present disclosure is not limited to the above-mentioned embodiment and various other applications and modifications may be made without departing from the gist of the present disclosure defined by claims. It should be noted that the present technology may also take the following configurations.

(1) An operation method, including:

outputting, when an input operation of an operation target displayed on a display apparatus is performed on an input apparatus, a displacement value corresponding to a first displacement amount of the input apparatus;

calculating, based on the displacement value, the first displacement amount of the input apparatus;

displaying, if the calculated first displacement amount of the input apparatus falls within a predetermined threshold range, the operation target displaced by the first displacement amount, and displaying, if the first displacement amount of the input apparatus departs from the predetermined threshold range, the operation target displaced by a second displacement amount that emphasizes the first displacement amount; and providing feedback indicating that the operation target is displaced.

(2) The operation method according to Item (1), in which the second displacement amount is made larger than the first displacement amount if the first displacement amount is larger than a first displacement amount threshold.

(3) The operation method according to Item (1), in which the second displacement amount is made smaller than the first displacement amount if the first displacement amount is smaller than a first displacement amount threshold.

(4) The operation method according to any one of Items (1) to (3), in which the second displacement amount gradually decreases even when the first displacement amount is constant depending on the kind of the operation target, and the feedback is provided at an interval increased corresponding to the gradually decreasing second displacement amount.

(5) The operation method according to any one of Items (1) to (3), in which the second displacement amount gradually increases even when the first displacement amount is constant depending on the kind of the operation target, and the feedback is provided at an interval reduced corresponding to the gradually increasing second displacement amount.

(6) The operation method according to any one of Items (1) to (5), in which the displacement value includes an angular velocity value outputted by an angular velocity sensor housed in the input apparatus as the first displacement amount, and the second displacement amount is calculated based on a rotation angle and a rotation direction of the input apparatus that are calculated based on the displacement value.

(7) The operation method according to any one of Items (1) to (6), in which the displacement value includes an acceleration value outputted by an acceleration sensor housed in the input apparatus as the first displacement amount, and the second displacement amount is calculated based on a velocity and a moving distance of the input apparatus that are calculated based on the displacement value, the second displacement amount having a variable ratio to the first displacement amount.

(8) The operation method according to any one of Items (1) to (7), in which the input apparatus has one of a spherical shape, a regular polyhedron shape, and a semiregular polyhedron shape as an outer shape.

(9) The operation method according to any one of Items (1) to (8), in which the first displacement amount is calculated based on an amount of displacement along one axis, two orthogonal axes, or three orthogonal axes.

(10) The operation method according to any one of Items (1) to (9), in which the providing feedback includes providing different feedback for each amount of displacement along the one axis.

(11) The operation method according to any one of Items (1) to (10), in which the providing feedback includes providing feedback using at least one of a sound, a light beam, and a vibration.

(12) A control apparatus, including:

an arithmetic unit configured to calculate, when an input operation of an operation target displayed on a display unit is performed on an input apparatus, a first displacement amount of the input apparatus based on a displacement value corresponding to the first displacement amount of the input apparatus;

a display controller configured to display, if the calculated first displacement amount of the input apparatus falls within a predetermined threshold range, the operation target displaced by the first displacement amount, and to display, if the first displacement amount of the input apparatus departs from the predetermined threshold range, the operation target displaced by a second displacement amount that emphasizes the first displacement amount on the display unit; and a transmission and reception unit configured to send, to the input apparatus, a feedback signal for causing an informing unit of the input apparatus to provide information on the displacement of the operation target.

(13) A program that causes a computer to execute:

outputting, when an input operation of an operation target displayed on a display apparatus is performed on an input apparatus, a displacement value corresponding to a first displacement amount of the input apparatus;

calculating, based on the displacement value, the first displacement amount of the input apparatus;

displaying, if the calculated first displacement amount of the input apparatus falls within a predetermined threshold range, the operation target displaced by the first displacement amount, and displaying, if the first displacement amount of the input apparatus departs from the predetermined threshold range, the operation target displaced by a second displacement amount that emphasizes the first displacement amount; and providing feedback indicating that the operation target is displaced.

(14) A control apparatus comprising a communication circuit configured to communicate with an input apparatus, a processor; and a memory device. The memory device storing instructions which when executed by the processor, causes the processor to receive displacement information from the input apparatus, and at least one of (i)

generate a displacement value for displacing an operation target on a display based on the displacement information, wherein a first set of instructions is used to calculate the displacement value if the displacement information is within a predetermined range, and a second set of instructions is used to calculate the displacement value if the displacement information is outside the predetermined range, and (ii) transmit a feedback signal to the input apparatus at a timing based on the displacement information, wherein the timing is calculated differently if the displacement information is within the predetermined range than if the displacement information is outside the predetermined range.

(15) A control apparatus according to Item (14), wherein the processor generates the displacement value, and if the displacement information is greater than the predetermined range, the second set of instructions calculates a greater displacement value than the first set of instructions.

(16) A control apparatus according to any one of Items (14) or (15), wherein the processor generates the displacement value, and if the displacement information is less than the predetermined range, the second set of instructions calculates a smaller displacement value than the first set of instructions.

(17) A control apparatus according to any one of Items (14) to (16), wherein the processor transmits the feedback signal, and the feedback signal indicates a displacement of the operation target on the display.

(18) A control apparatus according to any one of Items (14) to (17), wherein the timing is calculated based on the displacement value.

(19) A control apparatus according to any one of Items (14) to (18), wherein the processor transmits the feedback signal causing the input apparatus to output at least one of a sound, a light, and a vibration.

(20) A control method comprising receiving displacement information from an input apparatus; and at least one of (i) generating a displacement value for displacing an operation target on a display based on the displacement information, wherein a first set of instructions is used to calculate the displacement value if the displacement information is within a predetermined range, and a second set of instructions is used to calculate the displacement value if the displacement information is outside the predetermined range; and (ii) transmitting a feedback signal to the input apparatus at a timing based on the displacement information, wherein the timing is calculated differently if the displacement information is within the predetermined range than if the displacement information is outside the predetermined range.

(21) A control method according to Items (20), wherein the displacement value is generated, and if the displacement information is greater than the predetermined range, the second set of instructions calculates a greater displacement value than the first set of instructions.

(22) A control method according to any one of Items (20) or (21), wherein the displacement value is generated, and if the displacement information is less than the predetermined range, the second set of instructions calculates a smaller displacement value than the first set of instructions.

(23) A control method according to any one of Items (20) to (22), wherein the feedback signal is transmitted and the feedback signal indicates a displacement of the operation target on the display.

(24) A control method according to any one of Items (20) to (23), wherein the timing is calculated based on the displacement value.

(25) A control method according to any one of Items (20) to (24), wherein feedback signal is transmitted, and the feedback signal causes the input apparatus to output at least one of a sound, a light, and a vibration.

The present application contains subject matter related to that disclosed in Japanese Priority Patent Application JP 2012-094894 filed in the Japan Patent Office on Apr. 18, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

9 Informing mechanism
10 Input apparatus
11 CPU
14 Acceleration sensor
15 Angular velocity sensor
16 Magnetic sensor
20 Input apparatus main body
50 Control apparatus
51 CPU
60 Display apparatus
60a Display unit
70 Display apparatus
100, 100' Control system

The invention claimed is:

1. A control apparatus, comprising:
a communication circuit configured to communicate with an input apparatus;
a memory device configured to store a plurality of instructions; and
a processor configured to:
receive, from the input apparatus, displacement information that corresponds to an angular velocity of the input apparatus;
generate a displacement value to displace an operation target on a display screen, wherein
the displacement value is generated based on the displacement information,
the displacement value is generated by execution of a first set of instructions of the plurality of instructions, the execution of the first set of instructions is based on the displacement information which is within a range, and
the displacement value is generated by execution of a second set of instructions of the plurality of instructions, the execution of the second set of instructions is based on the displacement information which is outside the range;
receive, from the input apparatus, pressure information that corresponds to a position at which a pressure is applied on the input apparatus;
determine a type of motion of the operation target based on the pressure information;
control display of the operation target based on the type of motion of the operation target and the displacement value;
determine a time interval based on the displacement value; and
transmit a feedback signal to the input apparatus at the time interval, wherein the feedback signal is configured to control the input apparatus to output at least one of a sound or a vibration.

2. The control apparatus according to claim 1, wherein
the processor is further configured to generate the displacement value based on the displacement information which is greater than the range, and
the execution of the second set of instructions is configured to generate a greater displacement value than the execution of the first set of instructions.

3. The control apparatus according to claim 1, wherein
the processor is further configured to generate the displacement value based on the displacement information which is less than the range, and
the execution of the second set of instructions is configured to generate a smaller displacement value than the execution of the first set of instructions.

4. The control apparatus according to claim 1, wherein the feedback signal indicates displacement of the operation target on the display screen.

5. The control apparatus according to claim 1, wherein the input apparatus outputs light based on the feedback signal.

6. A control method, comprising:
in a control apparatus:
receiving, from an input apparatus, displacement information that corresponds to an angular velocity of the input apparatus;
generating, by a processor, a displacement value for displacing an operation target on a display screen, wherein
the displacement value is generated based on the displacement information,
the displacement value is generated by execution of a first set of instructions, the execution of the first set of instructions is based on the displacement information which is within a range, and
the displacement value is generated by execution of a second set of instructions, the execution of the second set of instructions is based on the displacement information which is outside the range;
receiving, from the input apparatus, pressure information that corresponds to a position at which a pressure is applied on the input apparatus;
determining a type of motion of the operation target based on the pressure information;
controlling display of the operation target based on the type of motion of the operation target and the displacement value;
determining a time interval based on the displacement value; and
transmitting a feedback signal to the input apparatus at the time interval, wherein the feedback signal is configured to control the input apparatus to output at least one of a sound or a vibration.

7. The control method according to claim 6, further comprising generating the displacement value based on the displacement information which is greater than the range,
wherein the execution of the second set of instructions is configured to generate a greater displacement value than the execution of the first set of instructions.

8. The control method according to claim 6, further comprising generating the displacement value based on the displacement information which is less than the range,
wherein the execution of the second set of instructions is configured to generate a smaller displacement value than the execution of the first set of instructions.

9. The control method according to claim 6, wherein the feedback signal indicates displacement of the operation target on the display screen.

10. The control method according to claim 6, wherein the input apparatus outputs light based on the feedback signal.

11. The control apparatus according to claim 1, wherein the processor is further configured to receive, from the input apparatus, at least one magnetic value that is used to determine an absolute position of the input apparatus.

\* \* \* \* \*